United States Patent
Svanberg

(10) Patent No.: US 10,924,416 B2
(45) Date of Patent: Feb. 16, 2021

(54) METHOD FOR TRAFFIC SHAPING USING A SERIAL PACKET PROCESSING ALGORITHM AND A PARALLEL PACKET PROCESSING ALGORITHM

(71) Applicant: Clavister AB, Örnsköldsvik (SE)

(72) Inventor: Rebecka Svanberg, Härnösand (SE)

(73) Assignee: Clavister AB, Örnsköldsvik (SE)

( * ) Notice: Subject to any disclaimer, the term of this patent is extended or adjusted under 35 U.S.C. 154(b) by 245 days.

(21) Appl. No.: 16/086,866

(22) PCT Filed: Mar. 23, 2017

(86) PCT No.: PCT/SE2017/050279
§ 371 (c)(1),
(2) Date: Sep. 20, 2018

(87) PCT Pub. No.: WO2017/164804
PCT Pub. Date: Sep. 28, 2017

(65) Prior Publication Data
US 2020/0220817 A1 Jul. 9, 2020

Related U.S. Application Data

(60) Provisional application No. 62/312,146, filed on Mar. 23, 2016.

(30) Foreign Application Priority Data

Mar. 23, 2016 (SE) ...................................... 1600105

(51) Int. Cl.
*H04L 12/815* (2013.01)
*H04L 12/819* (2013.01)
(Continued)

(52) U.S. Cl.
CPC ............ *H04L 47/22* (2013.01); *H04L 47/215* (2013.01); *H04L 47/32* (2013.01); *H04L 47/76* (2013.01); *H04L 47/828* (2013.01)

(58) Field of Classification Search
CPC ....... H04L 47/22; H04L 47/215; H04L 47/76; H04L 47/828; H04L 47/32
See application file for complete search history.

(56) References Cited

U.S. PATENT DOCUMENTS

| 4,578,797 A | * | 3/1986 | Satoh | ...................... H04L 25/05 370/545 |
| 2003/0067913 A1 | | 4/2003 | Georgiou et al. | |

(Continued)

FOREIGN PATENT DOCUMENTS

WO WO 2004/044733 A2 5/2004

*Primary Examiner* — Kiet Tang
(74) *Attorney, Agent, or Firm* — Blank Rome LLP

(57) ABSTRACT

A method and a network node for traffic shaping of a packet switched network is presented, the network node being arranged for processing packets to be transmitted in the network according to at least: —a serial packet processing algorithm $A_{ser}$ providing a synchronized utilization of a set of at least one processing unit; and—a parallel packet processing algorithm $A_{par}$ providing an at least partly unsynchronized utilization of the set of at least one processing unit; wherein—the processing of the packets corresponds to a total packet cost, which is cooperatively shared by the at least one processing unit of the set. The method further includes: —determining, when the processing according to the parallel packet processing algorithm A par is used for processing the packets, if shares of the total packet cost for one or more of the at least one processing units exceed a capacity to process packets for the at least one processing units, respectively, wherein each one of the shares corresponds to one or more packet; and—switching from the processing according to the parallel packet processing algo- (Continued)

rithm $A_{par}$ to processing according to the serial packet processing algorithm $A_{ser}$ if the shares of the total packet cost for one or more of the at least one processing units, respectively, is determined to exceed the capacity.

22 Claims, 6 Drawing Sheets

(51) Int. Cl.
*H04L 12/917* (2013.01)
*H04L 12/911* (2013.01)
*H04L 12/823* (2013.01)

(56) References Cited

U.S. PATENT DOCUMENTS

| | | |
|---|---|---|
| 2008/0301408 A1 | 12/2008 | Kranich |
| 2010/0322071 A1 | 12/2010 | Avdanin et al. |
| 2011/0310742 A1 | 12/2011 | Liu et al. |
| 2013/0054811 A1* | 2/2013 | Harrand .............. G06F 15/7825 709/226 |
| 2014/0169378 A1 | 6/2014 | Shumsky et al. |
| 2014/0281385 A1 | 9/2014 | Tu |

* cited by examiner

METHOD FOR TRAFFIC SHAPING USING A SERIAL PACKET PROCESSING ALGORITHM AND A PARALLEL PACKET PROCESSING ALGORITHM

TECHNICAL FIELD

The invention relates to a method for traffic shaping by use of a network node of a packet switched network. The invention also relates to a network node of a packet switched network arranged for traffic shaping. Furthermore, the invention also relates to a computer program, and a computer program product implementing the method.

BACKGROUND

Traffic shaping may be used for enforcing limits, priorities and/or fair sharing of network resources in a packet-switched network, such as e.g. a packet switched computer network. Most traffic shaping methods are based on the token bucket algorithm, the hierarchical token bucket algorithm (which is used e.g. by Linux) or similar algorithms. Also, some traffic shaping methods are based on the generic cell algorithm (GCRA). An existing method to prioritize packet-switched network traffic is to use different packet queues for different priority levels, and then to forward packets from the queues in the order of their priorities. The number of packets sent to the dequeuing device is then often controlled by the token bucket algorithm, or a similar algorithm.

The traffic shaping algorithm may be executed in a network node, such as e.g. in a firewall device, a router device, a gateway device, a media gateway device, or another suitable device through which packets in the network pass. Generally, the traffic shaping may be performed on packets of essentially any kind of traffic flowing through the network node, such as e.g. client-to-server traffic, peer-to-peer traffic, server-to-server traffic, or essentially any other kind of network traffic.

With the increasing demands of today for computational power and increasing network loads, increasing numbers of CPUs and/or CPU cores are utilized for processing packets in network nodes. The basic idea is then to take advantage of the increased computational power of the increasing numbers of CPUs and/or CPU cores when processing the packets. It is, however, a difficult to make efficient use of such multi-CPU and/or multi-CPU core solutions.

However, the above mentioned known traffic shaping algorithms all have packet processing efficiency problems. These problems of the known algorithms are at least partly related to the fact that the algorithms are developed, and also optimized, for single-threaded use for network nodes having one single CPU and/or one single CPU core. Thus, known traffic shaping algorithms of today have efficiency problems, that become more and more noticeable with increasing packet traffic in the network.

SUMMARY

An object of the embodiments of the invention is to provide a solution which mitigates or solves the above mentioned drawbacks and problems.

The above object and further object are achieved by the subject matter of the independent claims. Further advantageous implementation forms of the invention are defined by the dependent claims.

According to a first aspect of the invention, a method for traffic shaping, for example by use of a network node of a packet switched network, is presented. Packets may be processed to be transmitted in the network according to at least:

- a serial packet processing algorithm $A_{ser}$ providing a synchronized utilization of a set $S_{PU}$ of at least one processing unit $PU_1, PU_2, \ldots, PU_n$; and
- a parallel packet processing algorithm $A_{par}$ providing an at least partly unsynchronized utilization of the set $S_{PU}$ of at least one processing unit $PU_1, PU_2, \ldots, PU_n$; wherein the processing of the packets corresponds to a total packet cost $C_{tot}$, which is cooperatively shared by the at least one processing unit $PU_1, PU_2, \ldots, PU_n$ of the set $S_{PU}$. The method further includes:

determining, when the processing according to the parallel packet processing algorithm $A_{par}$ is used for processing the packets, if shares $C_1, C_2, \ldots, C_n$ of the total packet cost $C_{tot}$ for one or more of the at least one processing units $PU_1, PU_2, \ldots, PU_n$ exceed a capacity to process packets for the at least one processing units $PU_1, PU_2, \ldots, PU_n$, respectively, wherein each one of the shares $C_1, C_2, \ldots, C_n$ corresponds to one or more packet; and switching from the processing according to the parallel packet processing algorithm $A_{par}$ to processing according to the serial packet processing algorithm $A_{ser}$ if the shares $C_1, C_2, \ldots, C_n$ of the total packet cost $C_{tot}$ for one or more of the at least one processing units $PU_1, PU_2, \ldots, PU_n$, respectively, is determined to exceed the capacity.

Thus, the packets may be processed/executed/computed/calculated at least partly according to a parallel mode/algorithm $A_{par}$. The present invention is very suitable for work running in parallel over multiple (at least two) processing units, such as e.g. multiple CPU cores, which is very advantageous. In principle, an unlimited number of processing units, e.g. CPU cores, may be used for processing the data/information/packets/traffic when the present invention is utilized.

If there is an enough degree of freedom/changeability of phases, i.e. if there is a possibility for at least partly processing the packets according to the parallel mode/algorithm $A_{par}$, the method/algorithm steps traditionally having been performed by a set of synchronized serial processing units may, when the present invention is used, be split/spread/distributed to the processing units of the set $S_{PU}$ using the at least partly unsynchronized parallel mode/algorithm $A_{par}$.

Generally described, if at least one of the parallel/unsynchronized processing units cannot guarantee a proper/exact execution of the method/algorithm steps having been assigned to it, the remaining method/algorithm steps, corresponding to remaining packets, that should have been executed by the parallel/unsynchronized processing units may, according to an embodiment, be gathered/collected/assembled again. The remaining method/algorithm steps, i.e. the remaining packets, having been gathered/collected/assembled may then processed executed/computed/calculated according to the serial packet processing algorithm $A_{ser}$.

This works well e.g. if it is possible to accumulate degrees of freedom/changeability of phases while the packets are handled by serial mode/algorithm processing. If the parallel processing algorithm $A_{par}$ is well balanced over the set $S_{PU}$ of processing units, the probability for the processing to be able to continue in the parallel mode $A_{par}$ is increased. For example, if the packet processing according to the parallel algorithm $A_{par}$ is completely balanced, there is no need to return/go back to the serial mode/algorithm $A_{ser}$ processing again, which lowers the demands on the serial mode processing. In practical implementations, however, there might be a need for switching between the serial $A_{ser}$ and parallel $A_{par}$ modes/algorithms, based on the balance of the traffic/work load/processing for the processing units for the parallel mode/algorithm.

According to an embodiment of the first aspect, the at least partly unsynchronized parallel packet processing algorithm $A_{par}$ further includes:

prioritizing processing based on priority levels $P_{high}$; $P_{low}$ related to the at least one processing unit $PU_1$, $PU_2$, ..., $PU_n$ of the set $S_{PU}$, whereby:

a processing unit $PU_{high}$ related to a higher priority $P_{high}$ is allowed to process packets and to charge a fractional debt $D_{1\_frac}$, $D_{2\_frac}$, ..., $D_{n\_frac}$ corresponding to the processing of the packets to one or more processing unit $PU_{low}$ of the set $S_{PU}$ related to a lower priority $P_{low}$; and the shares $C_1$, $C_2$, ..., $C_n$ of the total packet cost $C_{tot}$ for the at least one processing unit $PU_1$, $PU_2$, ..., $PU_n$, respectively, include both fractional packet costs $C_{1\_frac}$, $C_{2\_frac}$, ..., $C_{n\_frac}$ and fractional debts $D_{1\_frac}$, $D_{2\_frac}$, ..., $D_{n\_frac}$; $C_1 = C_{1\_frac} + D_{1\_frac}$, $C_2 = C_{2\_frac} + D_{2\_frac}$, ..., $C_n = C_{n\_frac} + D_{n\_frac}$.

In other words, a prioritized packet processing is provided by the embodiment, which handles priority steps/tasks/issues by usage of at least partly independent limitation/limited units, such as e.g. tokens and/or token buckets. Each one of these limitation/limited units may then be assigned/related to a specific certain priority, e.g. a low priority $P_{low}$, such that a packet assigned a specified/certain priority only passes through the specific limitation/limited unit having been assigned that specific/certain priority, e.g. the low priority $P_{low}$.

A packet assigned a higher priority $P_{high}$ may instead pass through a specific/certain limitation/limited unit having been assigned that specific/certain higher priority $P_{high}$, but the cost for this higher priority packet/processing may be carried/debited to units assigned/related to a lower priority $P_{low}$. Hereby, the limiting/limited units may be similar, e.g. more or less identical, and/or may be independent, which makes it possible to execute the extra debiting of the units assigned/related to the lower priority $P_{low}$ in parallel. For example, this parallel debiting may be achieved by sending a virtual packet, where the virtual packet is configured to execute the debiting. This may be implemented such that the result is completely parallelized.

According to an embodiment of the first aspect, the fractional debts $D_{1\_frac}$, $D_{2\_frac}$, ..., $D_{n\_frac}$ are decremented over time when processing according to the parallel packet processing algorithm $A_{par}$ is used.

According to an embodiment of the first aspect, an at least partly unsynchronized processing unit $PU_1$, $PU_2$, ..., $PU_n$, which processes packets according to the parallel packet processing algorithm $A_{par}$ and for which the share $C_1$, $C_2$, ..., $C_n$ of the total packet cost $C_{tot}$ exceeds its capacity to process packets, is incapable to determine if the set $S_{PU}$ of at least one processing unit $PU_1$, $PU_2$, ..., $PU_n$ as a whole is able to process the packets; and the at least partly unsynchronized processing unit $PU_1$, $PU_2$, ..., $PU_n$ requests for the switch to the processing according to the serial packet processing algorithm $A_{ser}$ as a result of its incapability to determine if the set $S_{PU}$ of at least one processing unit $PU_1$, $PU_2$, ..., $CPU_n$ as a whole is able to process the packets.

According to an embodiment of the first aspect, one or more of the at least one processing unit $PU_1$, $PU_2$, ..., $PU_n$ are one in the group of:

a central processing unit (CPU); and a central processing unit core.

According to an embodiment of the first aspect:

the parallel packet processing algorithm $A_{par}$ is an at least partly unsynchronized token bucket algorithm;

the total packet cost $C_{tot}$ is related to a total number of tokens $N_{tot}$;

the total number of tokens $N_{tot}$ is portioned over the set $S_{PU}$ as fractional numbers of tokens $N_1$, $N_2$, ..., $N_n$ for the at least partly unsynchronized at least one processing unit $PU_1$, $PU_2$, ..., $PU_n$, respectively the shares $C_1$, $C_2$, ..., $C_n$ of the total packet cost $C_{tot}$ are related to the fractional numbers of tokens $N_1$, $N_2$, ..., $N_n$, respectively.

According to an embodiment of the first aspect: the share $C_1$, $C_2$, ..., $C_n$ of the total packet cost $C_{tot}$ for a processing unit $PU_1$, $PU_2$, ..., $PU_n$ is determined to exceed its capacity to process packets if one or more is true in the group of:

the share $C_1$, $C_2$, ..., $C_n$ of the processing unit $PU_1$, $PU_2$, ..., $PU_n$ exceeds its fractional number of tokens $N_1$, $N_2$, ..., $N_n$; $C_1 > N_1$, $C_2 > N_2$, ..., $C_n > N_n$; and the processing unit $PU_1$, $PU_2$, ..., $PU_n$ has zero (0) fractional number of tokens left, $N_1 = 0$, $N_2 = 0$, ..., $N_n = 0$.

According to an embodiment, the degrees of freedom/changeability of phases is related to a number of tokens of a token bucket. Then, there might be enough degree of freedom/changeability of phases if the token bucket includes, i.e. is filled with, enough tokens per parallel packet computing/algorithm processing unit to distribute at least one token per parallel packet computing/algorithm processing unit. Thus, the set $S_{PU}$ of processing units providing the parallel packet processing may, according to an embodiment, guarantee/provide a proper packet processing as long as they still have tokens, i.e. as long as they have not used up their respective fractional numbers of tokens $N_1$, $N_2$, ..., $N_n$.

According to an embodiment, the degrees of freedom/changeability of phases may be related to a generic algorithm. Then, there might be an enough degree of freedom/changeability of phases if the received traffic exceeds a threshold/limit, where the threshold/limit may indicate an allowed traffic limit, and/or if the set $S_{PU}$ of processing units processing packets according to the parallel algorithm $A_{par}$ can guarantee/provide a proper packet processing as long as the received traffic exceeds the threshold/limit. For traffic shaping, the threshold/limit is often set by a network administrator, and the threshold/limit may then be chosen to a suitable value. For example, the network traffic of one sort/type may be measured/determined, e.g. in bits per second, and the threshold/limit is then set to the maximal determined/measured traffic value, e.g. to the maximal bits per second, that sort/type of traffic is allowed to use. Generally, by limiting some sorts/types of traffic, more resources are made available for other types of traffic. It should be noted that the embodiments described in this documents may be implemented using a generic algorithm, although often being described herein for the token bucket algorithm.

According to an embodiment, which is mainly described in this document, the herein described traffic shaping method/algorithm for packet processing/executing/computing/calculating is at least temporarily and at least partly performed in a parallel mode $A_{par}$ and is combined with a token bucket method/algorithm. A token bucket algorithm is a method/algorithm implementing limitations in a network, as is herein described. The token bucket method/algorithm may be implemented with little addition to computational complexity. Thus, the token bucket method/algorithm may also be applied for the herein described packet processing methods. This results in an efficient and at least partly parallel packet processing/executing/computing/calculating method/algorithm, which processes/executes/computes/calculates the packets in accordance with the principles of the token bucket method/algorithm.

According to an embodiment of the first aspect, the fractional numbers of tokens $N_1, N_2, \ldots, N_n$ are incremented over time when processing according to the parallel packet processing algorithm $A_{par}$ is used.

According to an embodiment of the first aspect, the method further includes:
  summing up all of the fractional numbers of tokens $N_1, N_2, \ldots, N_n$ to an accumulated total number of tokens $N_{tot}$; $N_{tot}=N_1+N_2+\ldots+N_n$;
  summing up all shares $C_1, C_2, \ldots, C_n$ to an accumulated total cost $C_{tot}$; and
  utilizing the total number of tokens $N_{tot}$ and/or the total cost $C_{tot}$ when switching to processing according to the serial packet processing algorithm $A_{ser}$ and/or when switching to processing according to a drop mode algorithm $A_{drop}$.

According to an embodiment of the first aspect, the serial packet processing algorithm $A_{ser}$ includes:
  incrementing a total number of tokens $N_{tot}$ over time faster than tokens are spent by the serial packet processing algorithm $A_{ser}$; and
  switching from processing according to the serial packet processing algorithm $A_{ser}$ to the processing according to the parallel packet processing algorithm $A_{par}$ when the total number of tokens $N_{tot}$ is higher than a parallel processing threshold value $N_{tot\_par}$; $N_{tot}>N_{tot\_par}$.

According to an embodiment of the first aspect, the parallel processing threshold value $N_{tot\_par}$ is increased with a value $N_{debt\_sum}$ corresponding to a total debt $D_{tot}$ when the total cost $C_{tot}$ includes the total debt $D_{tot}$.

According to an embodiment of the first aspect, the method further includes:
  switching from processing according to the serial packet processing algorithm $A_{ser}$ to processing according to a drop mode algorithm $A_{drop}$; and
  processing the packets according to the drop mode algorithm $A_{drop}$ using the set $S_{PU}$ of the at least partly unsynchronized at least one processing unit $PU_1, PU_2, \ldots, PU_n$ if at least one is true in the group of:
    the total number of tokens $N_{tot}$ has a value of zero (0); $N_{tot}=0$; and
    the total cost $C_{tot}$ exceeds a total number of tokens $N_{tot}$; $C_{tot}>N_{tot}$.

According to an embodiment of the first aspect, the processing according to the drop mode algorithm $A_{drop}$ includes one or more actions in the group of:
  dropping at least one packet;
  queuing at least one packet; and
  transmitting at least one packet labelled as non-conformant.

The serial mode/algorithm $A_{ser}$ packet processing may be used for queuing packets. When the parallel mode/algorithm $A_{par}$ packet processing is used, no packets need to be queued, since at least one traffic characteristic, such as e.g. bits per second and/or packets per second, is lower than a configured threshold/limit. When the configured threshold/limit is exceeded, packets are received faster than they can be passed on. If this happens, and the packet queue is full, the algorithm calculates how long time it will take until it will be possible to pass at least one network packet. During this time, all packets arriving will have to be discarded/thrown away or have to be queued, i.e. in the drop mode $A_{drop}$. When the packet queue is full, i.e. exceeds the configured threshold/limit, there is no need for queuing packets in the drop mode $A_{drop}$ either, since the packets would then only be discarded anyway. Thus, the advantages of a packet queue are achieved, but the method/algorithm/queue only needs synchronization when the serial mode/algorithm $A_{ser}$ is active/used, i.e. when the access is synchronized anyway.

According to an embodiment of the first aspect, the method further includes, if a total number of tokens $N_{tot}$ exceeds the total cost $C_{tot}$; $N_{tot}>C_{tot}$:
  switching from processing according to the drop mode algorithm $A_{drop}$ to processing according to the serial packet processing algorithm $A_{ser}$; and
  processing the packets according to the serial mode algorithm $A_{ser}$.

Thus, the packet processing may be switched over to the serial packet processing algorithm $A_{ser}$ from the drop mode algorithm $A_{drop}$.

When traffic amounts are above the configured threshold/limit, the packet processing may in some situations temporarily switch over to serial packet processing $A_{ser}$, only to process a single packet. After that single packet has been processed, the packet processing would then immediately switch back to drop mode processing $A_{drop}$. As an optimization, the algorithm can according to an embodiment be extended to allow exactly one of the processing units of the set $S_{PU}$; 150 to temporary be switched into the serial mode processing $A_{ser}$. For example, the temporary switch to the serial mode/algorithm $A_{ser}$ may be effected by a try-lock mutex and/or by an atomic compare and set (CAS) operation, possibly depending on how the serial mode/algorithm $A_{ser}$ is implemented. According to the CAS operation, a known value is compared with a position/space in the computer/processor memory, and if the known value is stored in the memory it is atomically replaced/over-written with another value. If the known value is not present/stored in the memory position, nothing is written into the memory and the operation signals failure. For example, the known value may be a timestamp that is overwritten with the current time indication. Thus, only one processing unit will be able to successfully make a temporary switch to serial mode processing $A_{ser}$. Hereby, traffic amounts above the configured threshold/limit may be handled in parallel, at the same time as serial updates of packet queues and/or tokens may be effected. While only one processing unit will be successful in making the temporary switch to serial mode processing $A_{ser}$, this is here only done when one packet is to be passed. Hereby, all processing units of the set $S_{PU}$ are making progress anyway, and a wait-free/non-blocking algorithm extension is achieved.

According to an embodiment of the first aspect, the method further includes:
  defining a set of at least one active group $G_1, G_2, \ldots G_K$, each group being related to one or more devices receiving packets via the network node; and
  allocating at least one bandwidth portion of an available bandwidth in the network for the at least one active group $G_1, G_2, \ldots G_K$ of the set, respectively, wherein the allocating is performed in parallel and at least partly unsynchronized for the at least one active group $G_1, G_2, \ldots G_K$.

According to an embodiment of the first aspect, the at least one client group $G_1, G_2, \ldots G_K$ is related to one or more in the group of:
- at least one source internet protocol (IP) address;
- at least one destination internet protocol (IP) address;
- at least one source network;
- at least one destination network;
- at least one source port;
- at least one destination port;
- at least one receiving interface;
- at least one forwarding interface;
- at least one parameter related to application layer data; and
- at least one partition of network traffic.

According to an embodiment of the first aspect, the allocating of the at least one bandwidth portion is performed such that the available bandwidth is essentially equally divided between the at least one group $G_1, G_2, \ldots G_K$.

According to an embodiment of the first aspect, the allocating of the at least one bandwidth portion further includes:
- determining if one or more bandwidth portions of the at least one group $G_1, G_2, \ldots G_K$ is unused; and
- reallocating the one or more unused bandwidth portions to one or more other of the at least one group $G_1, G_2, \ldots G_K$ being in need of more bandwidth.

According to an embodiment of the first aspect, the one or more groups $G_1, G_2, \ldots G_K$ being in need of more bandwidth compete with each other for the one or more bandwidth portions being reallocated.

According to a second aspect of the invention, a network node is presented, the network node including a processing device arranged for processing packets to be transmitted in the network according to at least:
- a serial packet processing algorithm $A_{ser}$ providing a synchronized utilization of a set $S_{PU}$ of at least one processing unit $PU_1, PU_2, \ldots, PU_n$; and
- a parallel packet processing algorithm $A_{par}$ providing an at least partly unsynchronized utilization of the set $S_{PU}$ of at least one processing unit $PU_1, PU_2, \ldots, PU_n$; wherein the processing of the packets corresponds to a total packet cost $C_{tot}$, which is cooperatively shared by the at least one processing unit $PU_1, PU_2, \ldots, PU_n$ of the set $S_{PU}$. The processing device is further arranged for:
- determining, when the processing according to the parallel packet processing algorithm $A_{par}$ is used for processing the packets, if shares $C_1, C_2, \ldots, C_n$ of the total packet cost $C_{tot}$ for one or more of the at least one processing units $PU_1, PU_2, \ldots, PU_n$ exceed a capacity to process packets for the at least one processing units $PU_1, PU_2, \ldots, PU_n$, respectively, wherein each one of the shares $C_1, C_2, \ldots, C_n$ corresponds to one or more packet; and
- switching from the processing according to the parallel packet processing algorithm $A_{par}$ to processing according to the serial packet processing algorithm $A_{ser}$ if the shares $C_1, C_2, \ldots, C_n$ of the total packet cost $C_{tot}$ for one or more of the at least one processing units $PU_1, PU_2, \ldots, PU_n$, respectively, is determined to exceed the capacity.

According to an embodiment of the second aspect, the processing device is arranged for in the at least partly unsynchronized parallel packet processing algorithm $A_{par}$ further including:
- prioritizing processing based on priority levels $P_{high}$; $P_{low}$ related to the at least one processing unit $PU_1, PU_2, \ldots, PU_n$ of the set $S_{PU}$, whereby:
  a processing unit $PU_{high}$ related to a higher priority $P_{high}$ is allowed to process packets and to charge a fractional debt $D_{1\_frac}, D_{2\_frac}, \ldots, D_{n\_frac}$ corresponding to the processing of the packets to one or more processing unit $PU_{low}$ of the set $S_{PU}$ related to a lower priority $P_{low}$; and
- the shares $C_1, C_2, \ldots, C_n$ of the total packet cost $C_{tot}$ for the at least one processing unit $PU_1, PU_2, \ldots, PU_n$, respectively, include both fractional packet costs $C_{1\_frac}, C_{2\_frac}, \ldots, C_{n\_frac}$ and fractional debts $D_{1\_frac}, D_{2\_frac}, \ldots, D_{n\_frac}$; $C_1 = C_{1\_frac} + D_{1\_frac}$, $C_2 = C_{2\_frac} + D_{2\_frac}, \ldots, C_n = C_{n\_frac} + D_{n\_frac}$.

According to an embodiment of the second aspect, the processing device is arranged for decrementing the fractional debts $D_{1\_frac}, D_{2\_frac}, \ldots, D_{n\_frac}$ over time when processing according to the parallel packet processing algorithm $A_{par}$ is used.

According to an embodiment of the second aspect, the processing device is arranged for
- determining an at least partly unsynchronized processing unit $PU_1, PU_2, \ldots, PU_n$, which processes packets according to the parallel packet processing algorithm $A_{par}$ and for which the share $C_1, C_2, \ldots, C_n$ of the total packet cost $C_{tot}$ exceeds its capacity to process packets, as incapable to determine if the set $S_{PU}$ of at least one processing unit $PU_1, PU_2, \ldots, PU_n$ as a whole is able to process the packets; and
- requesting, by use of the at least partly unsynchronized processing unit $PU_1, PU_2, \ldots, PU_n$, for the switch to the processing according to the serial packet processing algorithm $A_{ser}$ as a result of its incapability to determine if the set $S_{PU}$ of at least one processing unit $PU_1, PU_2, \ldots, CPU_n$ as a whole is able to process the packets.

According to an embodiment of the second aspect, one or more of the at least one processing unit $PU_1, PU_2, \ldots, PU_n$ are one in the group of:
- a central processing unit (CPU); and
- a central processing unit core.

According to an embodiment of the second aspect,
- the parallel packet processing algorithm $A_{par}$ is an at least partly unsynchronized token bucket algorithm;
- the total packet cost $C_{tot}$ is related to a total number of tokens $N_{tot}$;
- the total number of tokens $N_{tot}$ is portioned over the set $S_{PU}$ as fractional numbers of tokens $N_1, N_2, \ldots, N_n$ for the at least partly unsynchronized at least one processing unit $PU_1, PU_2, \ldots, PU_n$, respectively
- the shares $C_1, C_2, \ldots, C_n$ of the total packet cost $C_{tot}$ are related to the fractional numbers of tokens $N_1, N_2, \ldots, N_n$, respectively.

According to an embodiment of the second aspect, the processing device is arranged to determine the share $C_1, C_2, \ldots, C_n$ of the total packet cost $C_{tot}$ for a processing unit $PU_1, PU_2, \ldots, PU_n$; 151, 152, ..., 15n to exceed its capacity to process packets if one or more is true in the group of:
- the share $C_1, C_2, \ldots, C_n$ of the processing unit $PU_1, PU_2, \ldots, PU_n$ exceeds its fractional number of tokens $N_1, N_2, \ldots, N_n$; $C_1 > N_1$, $C_2 > N_2, \ldots, C_n > N_n$; and the processing unit $PU_1$, $PU_2$, ..., $PU_n$ has zero (0) fractional number of tokens left, $N_1=0$, $N_2=0$, ..., $N_n=0$.

According to an embodiment of the second aspect, the processing device is arranged to increment the fractional numbers of tokens $N_1$, $N_2$, ..., $N_n$ over time when processing according to the parallel packet processing algorithm $A_{par}$ is used.

According to an embodiment of the second aspect, the processing device is further arranged for:
  summing up all of the fractional numbers of tokens $N_1$, $N_2$, ..., $N_n$ to an accumulated total number of tokens $N_{tot}$; $N_{tot}=N_1+N_2+...+N_n$;
  summing up all shares $C_1$, $C_2$, ..., $C_n$ to an accumulated total cost $C_{tot}$; and
  utilizing the total number of tokens $N_{tot}$ and/or the total cost $C_{tot}$ when switching to processing according to the serial packet processing algorithm $A_{ser}$ and/or when switching to processing according to a drop mode algorithm $A_{drop}$.

According to an embodiment of the second aspect, the processing device is arranged to in the serial packet processing algorithm $A_{ser}$ include:
  incrementing a total number of tokens $N_{tot}$ over time faster than tokens are spent by the serial packet processing algorithm $A_{ser}$; and
  switching from processing according to the serial packet processing algorithm $A_{ser}$ to the processing according to the parallel packet processing algorithm $A_{par}$ when the total number of tokens $N_{tot}$ is higher than a parallel processing threshold value $N_{tot\_par}$; $N_{tot}>N_{tot\_par}$.

According to an embodiment of the second aspect, the processing device is arranged to increase the parallel processing threshold value $N_{tot\_par}$ with a value $N_{debt\_sum}$ corresponding to a total debt $D_{tot}$ when the total cost $C_{tot}$ includes the total debt $D_{tot}$.

According to an embodiment of the second aspect, the processing device is further arranged to:
  switching from processing according to the serial packet processing algorithm $A_{ser}$ to processing according to a drop mode algorithm $A_{drop}$; and
  processing the packets according to the drop mode algorithm $A_{drop}$ using the set $S_{PU}$ of the at least partly unsynchronized at least one processing unit $PU_1$, $PU_2$, ..., $PU_n$ if at least one is true in the group of:
    the total number of tokens $N_{tot}$ has a value of zero (0); $N_{tot}=0$; and
    the total cost $C_{tot}$ exceeds a total number of tokens $N_{tot}$; $C_{tot}>N_{tot}$.

According to an embodiment of the second aspect, the processing device is arranged to in processing according to the drop mode algorithm $A_{drop}$ include one or more actions in the group of:
  dropping at least one packet;
  queuing at least one packet; and
  transmitting at least one packet labelled as non-conformant.

According to an embodiment of the second aspect, the processing device is further arranged for, if a total number of tokens $N_{tot}$ exceeds the total cost $C_{tot}$; $N_{tot}>C_{tot}$:
  switching from processing according to the drop mode algorithm $A_{drop}$ to processing according to the serial packet processing algorithm $A_{ser}$; and
  processing the packets according to the serial mode algorithm $A_{ser}$.

According to an embodiment of the second aspect, the processing device is further arranged for:
  defining a set of at least one active group $G_1$, $G_2$, ... $G_K$, each group being related to one or more devices receiving packets via the network node; and
  allocating at least one bandwidth portion of an available bandwidth in the network for the at least one active group $G_1$, $G_2$, ... $G_K$ of the set, respectively, wherein the allocating is performed in parallel and at least partly unsynchronized for the at least one active group $G_1$, $G_2$, ... $G_K$.

According to an embodiment of the second aspect, the processing device is arranged to relate the at least one client group $G_1$, $G_2$, ... $G_K$ to one or more in the group of:
  at least one source internet protocol (IP) address;
  at least one destination internet protocol (IP) address;
  at least one source network;
  at least one destination network;
  at least one source port;
  at least one destination port;
  at least one receiving interface;
  at least one forwarding interface;
  at least one parameter related to application layer data; and
  at least one partition of network traffic.

According to an embodiment of the second aspect, the processing device is arranged to perform the allocating of the at least one bandwidth portion such that the available bandwidth is essentially equally divided between the at least one group $G_1$, $G_2$, ... $G_K$.

According to an embodiment of the second aspect, the processing device is arranged for in the allocating of the at least one bandwidth portion further include:
  determining if one or more bandwidth portions of the at least one group $G_1$, $G_2$, ... $G_K$ is unused; and
  reallocating the one or more unused bandwidth portions to one or more other of the at least one group $G_1$, $G_2$, ... $G_K$ being in need of more bandwidth.

According to an embodiment of the second aspect, the processing device is arranged for having the one or more groups $G_1$, $G_2$, ... $G_K$ being in need of more bandwidth compete with each other for the one or more bandwidth portions being reallocated.

The advantages for any network node according to the second aspect of the present invention are the same as for the corresponding method according to the first aspect.

Embodiments of the invention also relate to a computer program, characterized in code means, which when run by processing means causes said processing means to execute any method according to the invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the invention will be apparent from the following detailed description.

BRIEF DESCRIPTION OF THE DRAWINGS

The appended drawings are intended to clarify and explain different embodiments of the invention, in which.

DETAILED DESCRIPTION

Figure 1:
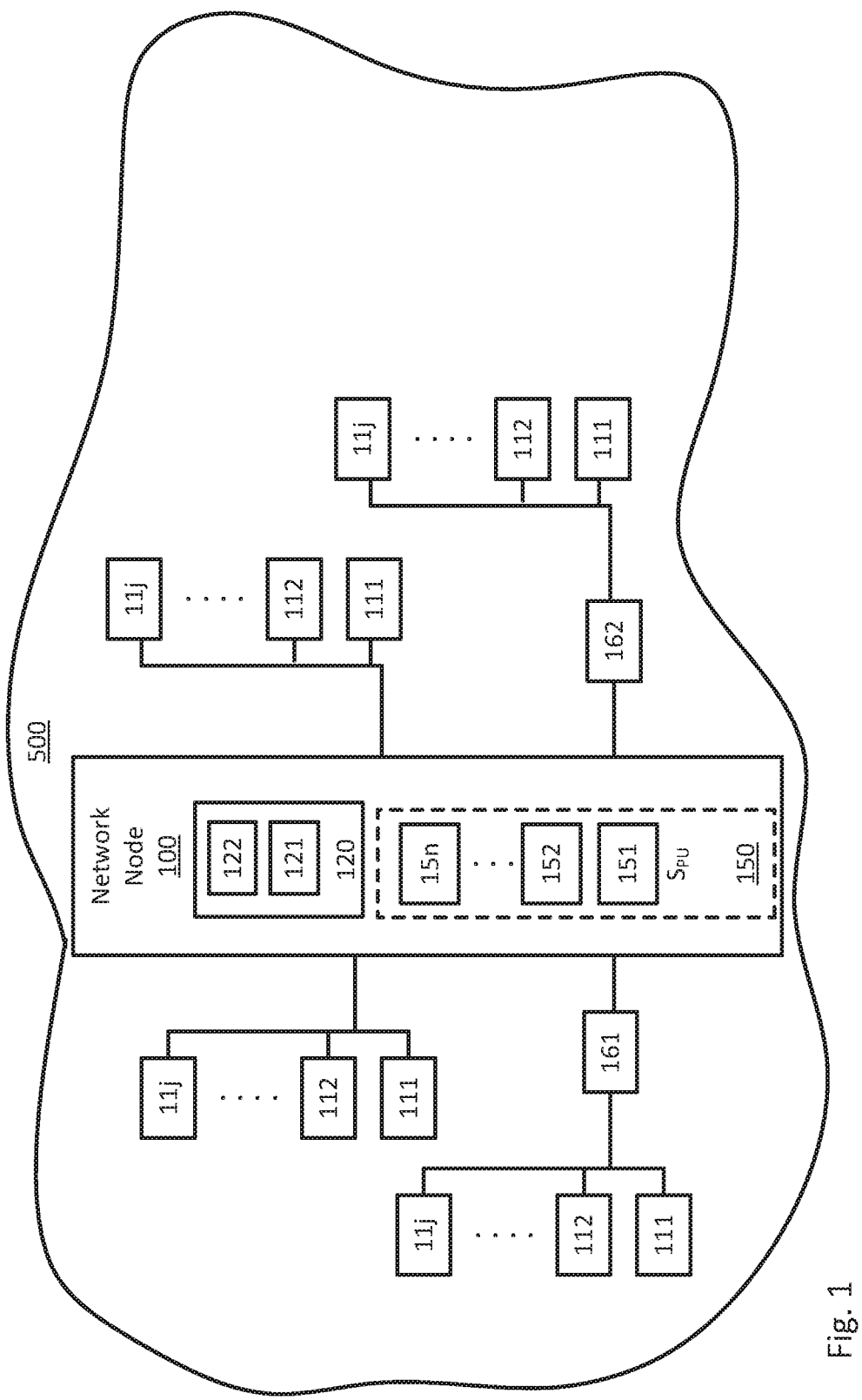
FIG. 1 schematically shows a network node and a network.

FIG. 1 schematically illustrates a packet switched network 500, in which a number of communicating entities 111, 112, ..., 11j, that also may be denoted endpoint entities/ users/clients, are connected via a network node 100, and according to some embodiments, also via one or more routers 161, 162 possibly connected to other networks. The communicating entities 111, 112, ..., 11j may be connected to the network node 100 and/or the routers 161, 162 via at least one wide area network (WAN) and/or via at least one local area network (LAN).

The network node 100 may include one or more of a firewall device, a router device, a gateway device, a media gateway device, or another suitable device through which packets are passed. The network node 100 may according to the present invention be arranged for performing traffic shaping on packets of essentially any kind of traffic flowing through the network node.

A network node 100 according to the present invention includes a processing device 120 which is arranged for performing the method of the different embodiments of the present invention, e.g. by means/control units 121, 122 arranged for performing the steps of the method. For simplicity, only two means/control units 121, 122 are shown in FIG. 1, but there may of course be more than two such means/control units of the processing device 120. The processing device 120 is in FIG. 1 illustrated as including separately illustrated means/control units 121, 122. These units 121, 122 can, however, be at least to some extent logically separated but implemented in the same physical device. These means/control units 121, 122 may also be part of a single logic unit/device, which is implemented in at least two different physical units/devices. These means/ control units 121, 122 may also be at least to some extent logically separated and implemented in at least two different physical units/devices. Further, these means/control units 121, 122 may further be both logically and physically arranged together, i.e. be part of a single logic unit which is implemented in a single physical unit/device. These means/ control units 121, 122 may for example correspond to groups of instructions, which can be in the form of programming code, that are input into, and are utilized by, at least one processor when the means/control units are active and/or are utilized for performing its method step, respectively.

The processing device 120 is arranged for performing a serial packet processing algorithm $A_{ser}$ providing a synchronized utilization of a set $S_{PU}$; 150 of at least one processing unit $PU_1, PU_2, \ldots, PU_n$; 151, 152, ..., 15n. Each one of the at least one processing unit $PU_1, PU_2, \ldots, PU_n$; 151, 152, ..., 15n may in this document e.g. be a central processing unit (CPU) and/or a central processing unit core. The network node 100 is also arranged for performing a parallel packet processing algorithm $A_{par}$ providing an at least partly unsynchronized utilization of the set $S_{PU}$; 150 of at least one processing unit $PU_1, PU_2, \ldots, PU_n$; 151, 152, ..., 15n.

The processing of the packets passing through the network node 100 corresponds to a total packet cost $C_{tot}$. This total packet cost $C_{tot}$ is cooperatively shared by the at least one processing unit $PU_1, PU_2, \ldots, PU_n$; 151, 152, ..., 15n of the set $S_{PU}$; 150.

Figure 2A:
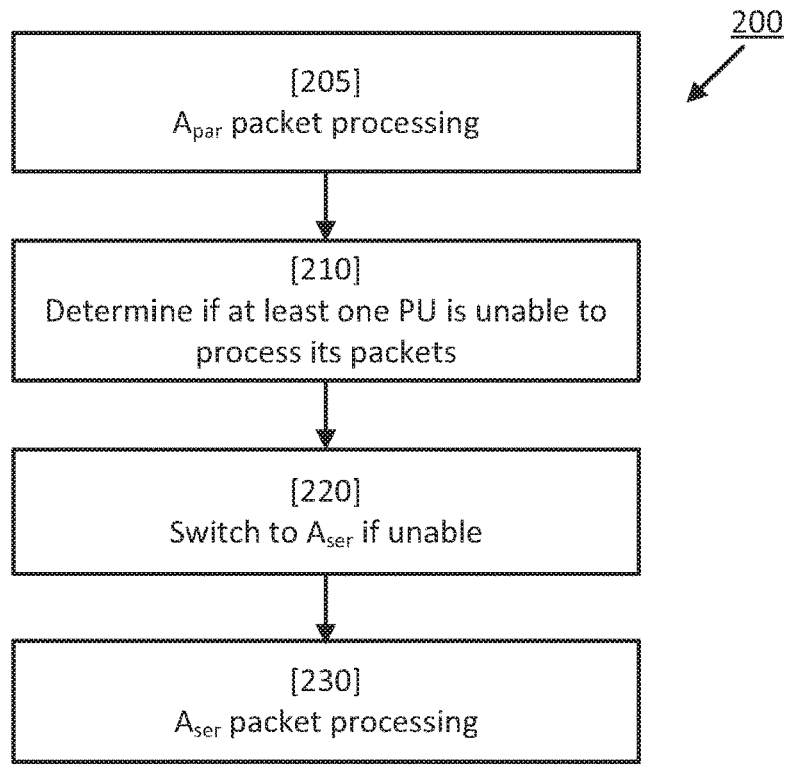
FIGS. 2a-f show flow chart diagrams for different embodiments of the method of the present invention.

FIG. 2a illustrates a method according to an embodiment of the present invention.

In a first step 205, the parallel packet processing algorithm $A_{par}$ is used for processing said packets.

In a second step 210, it is determined if shares $C_1, C_2, \ldots, C_n$ of the total packet cost $C_{tot}$ for one or more of the at least one processing units $PU_1, PU_2, \ldots, PU_n$; 151, 152, ..., 15n exceed a capacity to process packets for that at least one processing units $PU_1, PU_2, \ldots, PU_n$; 151, 152, ..., 15n, respectively. Each one of the shares $C_1, C_2, \ldots, C_n$ here corresponds to one or more packet. Each packet is processed in its entirety by one of the processing units $PU_1, PU_2, \ldots, PU_n$; 151, 152, ..., 15n. Thus, it is determined if one or more of the processing units $PU_1, PU_2, \ldots, PU_n$; 151, 152, ..., 15n are unable to process its packets. However, different processing units may of course process different whole packets simultaneously, i.e. may process whole/entire packets in parallel.

In a third step 220, the packet processing is switched from processing according to the parallel packet processing algorithm $A_{par}$ to processing according to the serial packet processing algorithm $A_{ser}$ if the shares $C_1, C_2, \ldots, C_n$ of the total packet cost $C_{tot}$ for one or more of the at least one processing units $PU_1, PU_2, \ldots, PU_n$; 151, 152, ..., 15n, respectively, is determined in the second step 210 to exceed the capacity. Thus, the packet processing is switched from processing according to the parallel packet processing algorithm $A_{par}$ to processing according to the serial packet processing algorithm $A_{ser}$ if one or more of the processing units $PU_1, PU_2, \ldots, PU_n$; 151, 152, ..., 15n are unable to process its packets.

In a fourth step 230, packet processing utilizing the serial packet processing algorithm $A_{ser}$ is then used.

When processing according to the parallel packet processing algorithm $A_{par}$, the at least partly unsynchronized one or more processing units $PU_1, PU_2, \ldots, PU_n$; 151, 152, ..., 15n process packets according to the parallel packet processing algorithm $A_{par}$ and are therefore also associated with a corresponding share $C_1, C_2, \ldots, C_n$ of the total packet cost $C_{tot}$. If one of the unsynchronized processing units $PU_1, PU_2, \ldots, PU_n$; 151, 152, ..., 15n exceeds its capacity to process packets, that processing unit knows that it is itself not able to process its part/fraction of the total number of packets to be processed. However, since the processing units are at least partly unsynchronized, that processing unit is incapable to determine if the set $S_{PU}$; 150 of at least one processing unit $PU_1, PU_2, \ldots, PU_n$; 151, 152, ..., 15n as a whole is able to process the packets. Therefore, the processing unit $PU_1, PU_2, \ldots, PU_n$; 151, 152, ..., 15n exceeding its capacity to process packets, according to the embodiment, requests for the switch to processing according to the serial packet processing algorithm $A_{ser}$. Thus, since the processing unit $PU_1, PU_2, \ldots, PU_n$; 151, 152, ..., 15n exceeding its own capacity is incapable to determine if the set $S_{PU}$; 150 as a whole is able to process said packets, it will request for a switch of processing algorithm.

According to an embodiment of the present invention, the parallel packet processing algorithm $A_{par}$ is an at least partly unsynchronized token bucket algorithm. The total packet cost $C_{tot}$ is then related to a total number of tokens $N_{tot}$. The total number of tokens $N_{tot}$ may then be portioned over the set $S_{PU}$; 150 as fractional numbers of tokens $N_1, N_2, \ldots, N_n$ for the at least partly unsynchronized at least one processing unit $PU_1, PU_2, \ldots, PU_n$; 151, 152, ..., 15n, respectively. Correspondingly, the shares $C_1, C_2, \ldots, Cn$ of the total packet cost $C_{tot}$ are related to the fractional numbers of tokens $N_1, N_2, \ldots, N_n$, respectively.

The share $C_1, C_2, \ldots, C_n$ of the total packet cost $C_{tot}$ may, according to an embodiment of the present invention, be determined 210 to exceed the capacity of a processing unit $PU_1, PU_2, \ldots, PU_n$; 151, 152, ..., 15n to process packets if the share $C_1, C_2, \ldots, C_n$ of the processing unit $PU_1, PU_2, \ldots, PU_n$; 151, 152, ..., 15n exceeds its own fractional number of tokens $N_1, N_2, \ldots, N_n$; $C_1 > N_1$, $C_2 > N_2, \ldots, C_n > N_n$, and/or if the processing unit $PU_1, PU_2, \ldots, PU_n$; 151, 152, ..., 15n has zero (0) fractional number of its own tokens left, $N_1 = 0, N_2 = 0, \ldots, N_n = 0$.

The fractional numbers of tokens $N_1, N_2, \ldots, N_n$ are incremented over time, i.e. by a fractional quota, up to a maximum limit $N_{1\_lim}, N_{2\_lim}, \ldots, N_{n\_lim}$, when processing according to the parallel packet processing algorithm $A_{par}$ is used. Of course, these fractional numbers of tokens $N_1, N_2, \ldots, N_n$ are also spent when packets are processed, i.e. the cost for one or more packets to be processed are subtracted from the fractional numbers of tokens $N_1, N_2, \ldots, N_n$, respectively.

Figure 3:
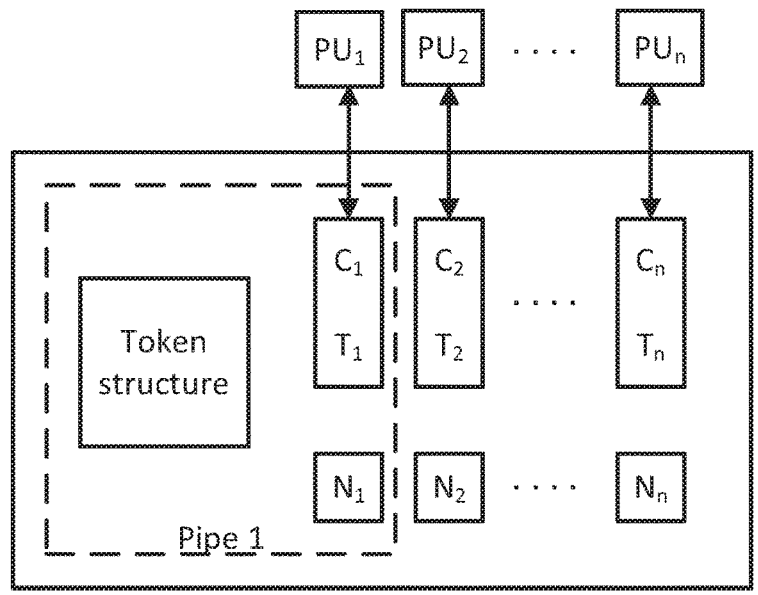
FIG. 3 schematically illustrates a processing structure and some parameters.

FIG. 3 schematically illustrates the shares $C_1, C_2, \ldots, C_n$ of the total packet cost $C_{tot}$, the fractional number of tokens $N_1, N_2, \ldots, N_n$ and their corresponding time stamps $T_1, T_2, \ldots, T_n$, the related processing units $PU_1, PU_2, \ldots, PU_n$, and a token structure. Also, a concept denoted pipe is schematically illustrated, where e.g. a first pipe (pipe 1) includes at least a part of the token structure/mode/algorithm, at least a fractional number of tokens $N_1$, a share $C_1$ of the total packet cost $C_{tot}$, and a timestamp $T_1$.

A token bucket algorithm, which may also be known as a leaky bucket algorithm, uses a conceptual bucket, which is filled with a certain number of tokens per time unit. The rate at which the bucket accumulates tokens is often called quota, and is often measured in tokens per second. Furthermore, the bucket may only hold a limited number of tokens, after which one or more tokens are discarded. The maximum number of tokens that the bucket can hold at any time is known as the bucket depth. One problem with the prior art token bucket algorithms is that they are based on a single state/mode usage. For the parallel processing algorithm according to the embodiments of the present invention, fractional buckets, fractional numbers of tokens $N_1, N_2, \ldots, N_n$, shares $C_1, C_2, \ldots, C_n$ of the total packet cost $C_{tot}$ and/or fractional token quotas may be defined as related to the parallel packet flows.

In other words, when enough numbers of tokens per processing unit PU have been accumulated during serial algorithm $A_{ser}$ packet processing, e.g. when a total number of tokens $N_{tot}$ is higher than a parallel processing threshold value $N_{tot\_par}$; $N_{tot} > N_{tot\_par}$; the traffic shaping may transit/switch from the serial mode/algorithm $A_{ser}$ processing to the parallel mode/algorithm $A_{par}$ processing, as is described in detail below. According to the parallel mode/algorithm $A_{par}$, as mentioned above, the single bucket may be partitioned into multiple, at least two, equal-sized per-PU buckets. Each per-PU bucket may start initially with e.g. an equal share of the total number of tokens $N_{tot}$, i.e. the fractional numbers of tokens $N_1, N_2, \ldots, N_n$ are granted an equal share of the quota (the token increment rate), and with a bucket depth. Since each processing unit PU may have a private per-PU bucket, the parallel mode may be free to update the private buckets without synchronization. Thus, each per-PU bucket may be given only a fraction of the quota, and each per-PU bucket may be of equal depth. Also, the sum of all tokens in the per-PU buckets may be equal to the tokens in the single bucket, i.e. may be equal to the total number of tokens $N_{tot}$, that is used by the serial mode/algorithm $A_{ser}$ processing. As mentioned above, if e.g. one or more of the per-PU buckets run out of its share of tokens, i.e. its fractional number of tokens $N_1, N_2, \ldots N_n$, the traffic shaping may transition/switch back to the serial mode/algorithm $A_{ser}$ processing.

Figure 2B:
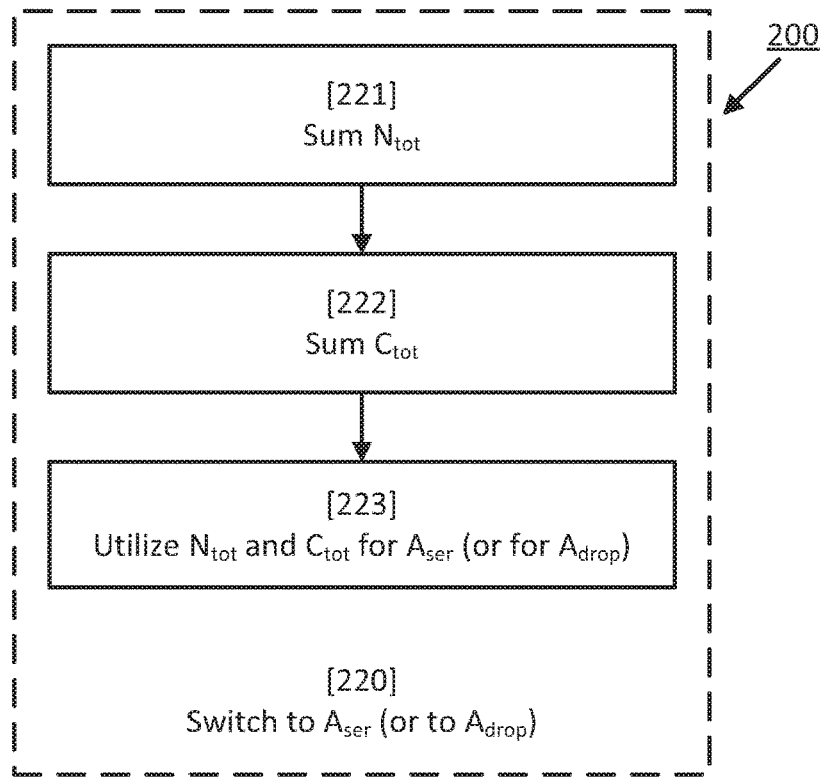

FIG. 2b illustrate an embodiment of the method 200 of the present invention, related to the switch 220 of the packet processing from the parallel algorithm $A_{par}$ to the serial algorithm $A_{ser}$ or to a drop mode algorithm $A_{drop}$.

In a first step 221 of the switch 220, all of the fractional numbers of tokens $N_1, N_2, \ldots, N_n$ are summed/added/accumulated to an accumulated total number of tokens $N_{tot}$; $N_{tot} = N_1 + N_2 + \ldots + N_n$.

In a second step 222 of the switch 220, all shares $C_1, C_2, \ldots, C_n$ of the cost are summed/added/accumulated to an accumulated total cost $C_{tot}$.

In a third step 223 of the switch 220, the total number of tokens $N_{tot}$ and/or the total cost $C_{tot}$ are used when the switch 220 to processing according to the serial packet processing algorithm $A_{ser}$ is done/effected and/or when switching to processing according to a drop mode algorithm $A_{drop}$ is done/effected.

Thus, according to an embodiment of the present invention, it may be guaranteed that a packet cost cannot slip through during the transition/switch from the parallel mode/algorithm $A_{par}$ processing to the serial mode/algorithm $A_{ser}$ processing. Since the total sum of tokens $N_{tot}$ is preserved, it is impossible for the processing units to forward a higher packet cost than a cost corresponding to the configured rate as a whole.

This may be seen as it is the responsibility of the functionality, e.g. the programming code, executing/performing the switch from parallel mode $A_{par}$ to the serial mode $A_{ser}$ processing, to ensure that no stray packets are still being processed according to the parallel mode/algorithm $A_{par}$, when the first packet is being processed by the synchronized serial mode/algorithm $A_{ser}$.

One solution to this problem is, according to an embodiment, to use a "run to completion" concept while processing packets using parallel mode/algorithm $A_{par}$, and assuring that a certain time, the certain time being longer than a maximum time it takes to process a single packet in the parallel mode $A_{par}$, has elapsed since the parallel mode processing was ended until packet processing according to the serial mode/algorithm $A_{ser}$ begins. For an optimized functionality/programming code, the certain time is typically very short. However, implementations of embodiment are not restricted to using this solution.

When the fractional per-PU numbers of tokens $N_1, N_2, \ldots; N_n$ are summed up in the serial mode/algorithm $A_{ser}$ processing, potentially a long time after one or more processing unit processed packets according to the parallel mode/algorithm $A_{par}$, the code/algorithm may take the individual time $T_1, T_2, \ldots, T_n$ into account. The individual time $T_1, T_2, \ldots, T_n$ may be taken into account since each of the fractional per-PU buckets were updated. Hereby, it may be determined when the last packet was processed, with or without synchronization. This allows the code/algorithm to sum all accumulated tokens $N_{tot}$ and to compensate for how frequently packets are processed by the corresponding processing unit.

Figure 2C:
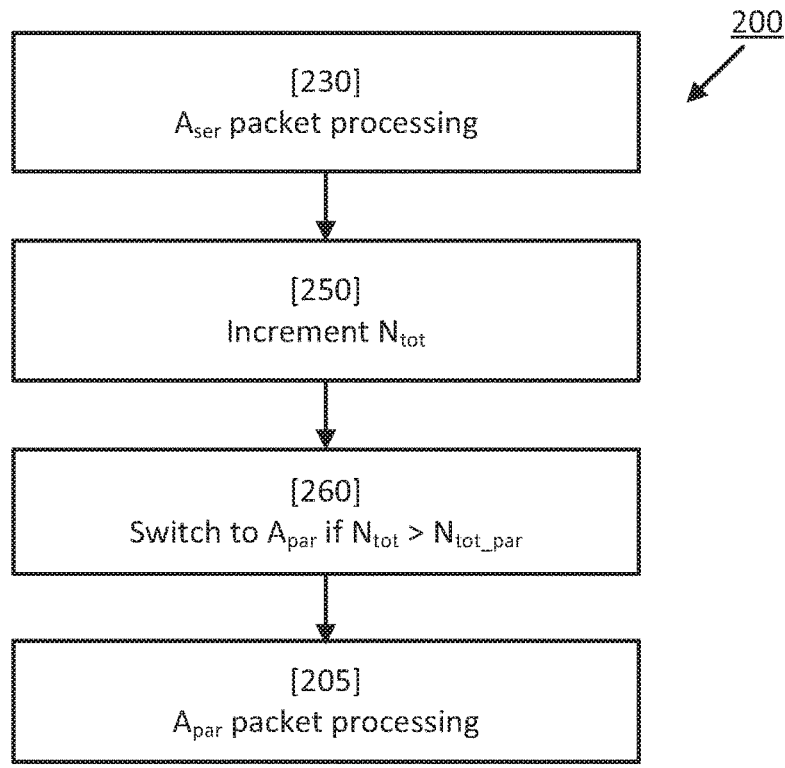

FIG. 2c illustrates an embodiment of the present invention.

In a first step 230, the synchronized serial packet processing algorithm $A_{ser}$ is utilized. The serial packet processing algorithm/mode $A_{ser}$ may for example correspond to a token bucket algorithm.

In a second step 250, a total number of tokens $N_{tot}$ is incremented faster over time than tokens are spent by the serial packet processing algorithm $A_{ser}$. This has an effect of an increase over time of the total number of tokens $N_{tot}$, since the number of tokens are incremented faster than tokens are subtracted from the bucket due to the packet processing.

In a third step 260, the packet processing switches from processing according to the serial packet processing algorithm $A_{ser}$ to processing according to the parallel packet processing algorithm $A_{par}$ when the total number of tokens $N_{tot}$ is higher than a parallel processing threshold value $N_{tot\_par}$; $N_{tot}>N_{tot\_par}$.

In a fourth step 205, the at least partly unsynchronized parallel processing algorithm $A_{par}$ is used for to processing the packets.

Generally, for the token bucket algorithm, a bucket is filled with tokens. The number of tokens to fill the bucket with may be calculated for each incoming packet, based on the time since the last packet was processed by the processing unit. This gives a high accuracy at the expense of performance, wherefore most implementations instead add tokens at regular intervals provided by a timer. The serial mode $A_{ser}$ offers an at least partly synchronized usage of the processing units, and is essentially unable to benefit from multiple processing units, since only one processing unit can process the packets in the serial mode/algorithm $A_{ser}$ at a given time. Thus, the packets are processed one by one in a synchronized manner by the processing units. In order for a packet to be processed by a processing unit, there must be at least one token left in the bucket for that processing unit. For each packet that is processed and sent further, the token cost of the packet is subtracted from the bucket.

Figure 2D:
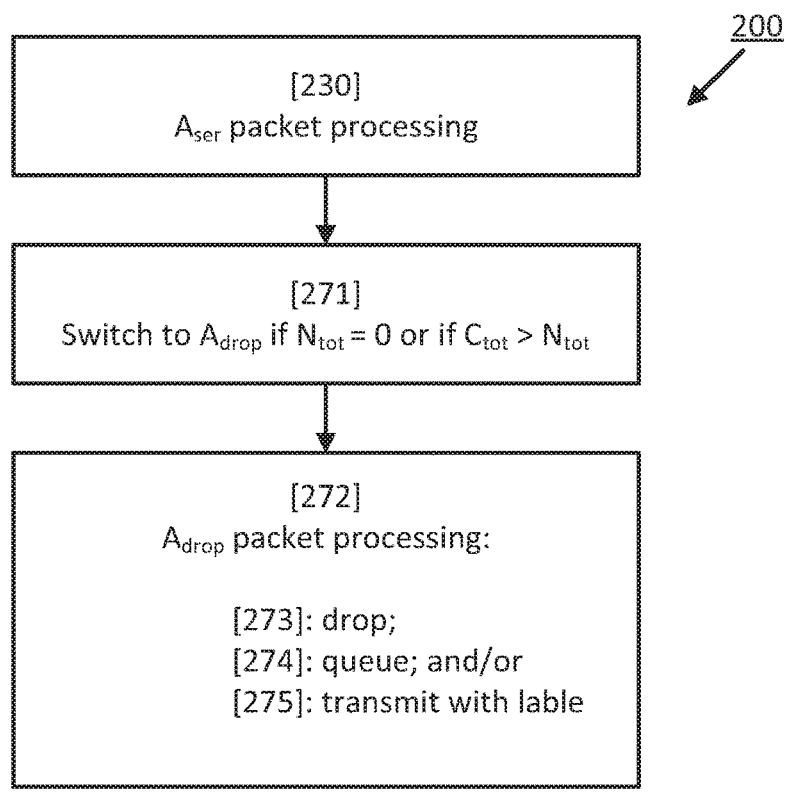

FIG. 2d illustrates an embodiment of the method 200 according to the present invention.

In a first step 230, packets are processed using the at least partly synchronized serial packet processing algorithm $A_{ser}$.

In a second step 271, the packet processing is switched from the synchronized serial packet processing algorithm $A_{ser}$ to a drop mode algorithm $A_{drop}$ if the total number of tokens $N_{tot}$ has a value of zero (0); $N_{tot}=0$; and/or if the total cost $C_{tot}$ exceeds a total number of tokens $N_{tot}$; $C_{tot}>N_{tot}$.

In a third step 272, the packets are processed according to the drop mode algorithm $A_{drop}$, which may e.g. include dropping 273 at least one packet, queuing 274 at least one packet and/or transmitting 275 at least one packet labelled as being non-conformant.

For example, if there are too few tokens left, e.g. if there are zero tokens, in the bucket, the packets may e.g. be put into a FIFO (First In First Out) queue and wait for tokens to accumulate.

Figure 2E:
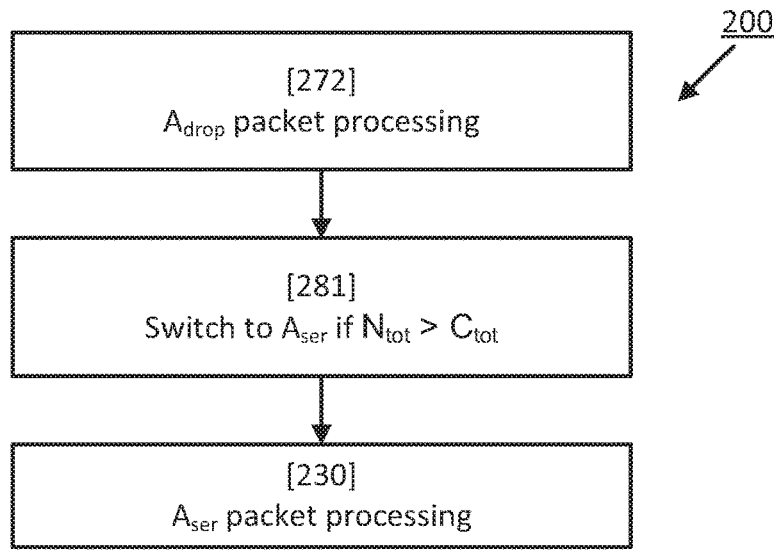

FIG. 2e illustrates an embodiment of the method 200 according to the present invention.

In a first step 272, packets are processed according to the drop mode algorithm $A_{drop}$.

In a second step, 281, the packet processing switches from processing according to the drop mode algorithm $A_{drop}$ to processing according to the serial packet processing algorithm $A_{ser}$ if a total number of tokens $N_{tot}$ exceeds the total cost $C_{tot}$; $N_{tot}>C_{tot}$.

In a third step, 230, the packets are processed according to the serial mode algorithm $A_{ser}$.

Figure 5:
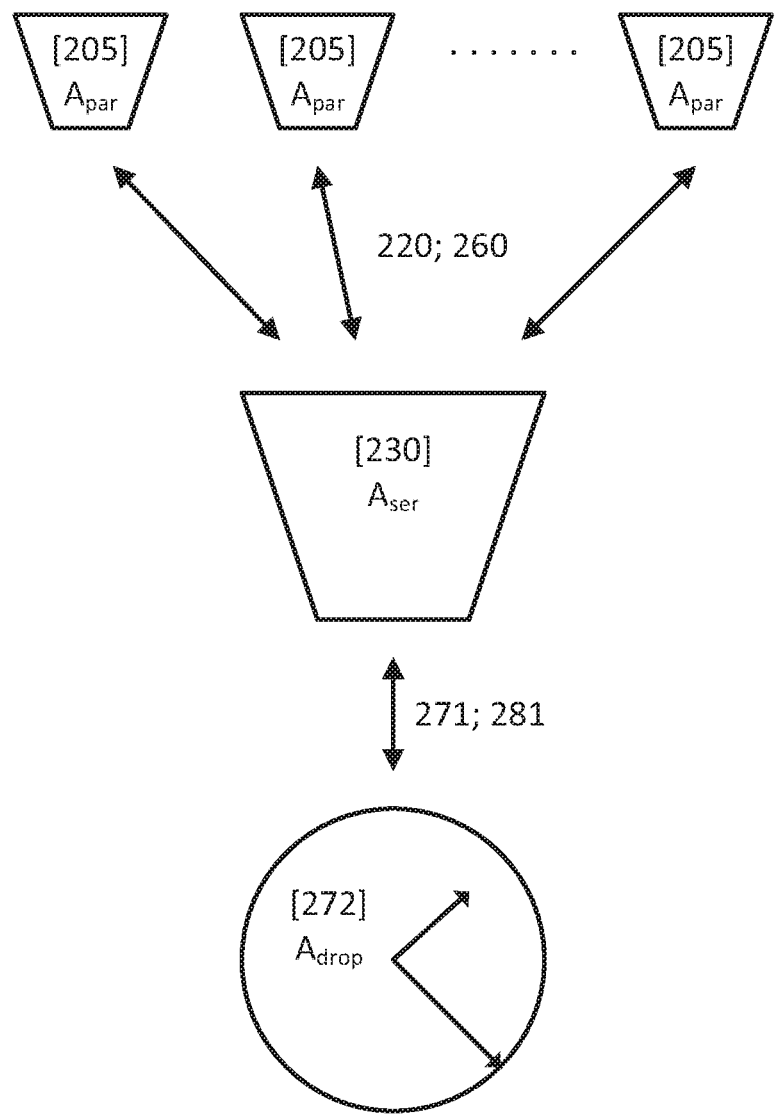
FIG. 5 schematically illustrates different packet processing algorithms and switching between them.

The embodiments described above, including packet processing according to the parallel packet processing algorithm $A_{par}$; 205, packet processing according to the serial packet processing algorithm $A_{ser}$; 230, packet processing according to the drop mode algorithm $A_{drop}$; 272, and switches 220, 260, 271, 281 between these processing algorithms, are schematically and generally illustrated in FIG. 5.

According to the drop mode/state/algorithm $A_{drop}$, packets to be processed are dropped, queued and/or transmitted with a label. For each packet that is to be processed, it is calculated how many tokens that have been accumulated in the bucket, but the calculation is only made to see when enough tokens have been accumulated to exit the drop mode, i.e. if a total number of tokens $N_{tot}$ exceeds the total cost $C_{tot}$; $N_{tot}>C_{tot}$. Essentially, this may for example be seen as the time it takes to get $N_{tot}>C_{tot}$, e.g. more than zero tokens, in the bucket is measured/estimated, and the packet queue/algorithm is not updated while processing according to the drop mode/algorithm $A_{drop}$, i.e. until a total number of tokens $N_{tot}$ exceeds the total cost $C_{tot}$; $N_{tot}>C_{tot}$.

Since the drop mode/algorithm $A_{drop}$ does not make any updates, the set $S_{PU}$ 150 of processing units may execute in full parallelism and without synchronization. As soon as the total number of tokens $N_{tot}$ exceeds the total cost $C_{tot}$; $N_{tot}>C_{tot}$, the traffic shaping will exit 281 processing according to the drop mode/algorithm $A_{drop}$ and instead enter processing according to the serial mode/algorithm $A_{ser}$ again.

The transition 281 from packet processing according to the drop $A_{drop}$ to according to the serial $A_{ser}$ mode/algorithm is potentially full of races/competition that may possibly allow packets to leak through. It should, however be noted that processing according to the drop mode/algorithm $A_{drop}$ is an event that typically happens on a much less frequent scale than packet processing according e.g. to the serial $A_{ser}$ or parallel $A_{par}$ algorithms, wherefore the complexity and cost of this transition 281 is not critical for the total performance of the traffic shaping. Also, the transition/switch 281 from processing according to the drop mode/algorithm $A_{drop}$ to processing according to the serial mode/algorithm $A_{ser}$ becomes even less frequent as the work load/total packet processing increases.

There is no synchronization of the processing units at all for packet processing according to the drop mode/algorithm $A_{drop}$. Also, packet processing according to the drop mode/algorithm $A_{drop}$ is performed in parallel. There are thus some common features for the drop mode/algorithm $A_{drop}$ processing and for the parallel mode/algorithm $A_{par}$ processing. However, the parallel mode/algorithm $A_{par}$ is limited by an upper limit, but the drop mode/algorithm $A_{drop}$ is limited by a lower limit, where both of these limits are actually the same limit and are related to a configured packet traffic rate to which the traffic should be limited.

When switching 281 from the drop mode/algorithm $A_{drop}$ to the serial mode/algorithm $A_{ser}$, there is a possibility that more than one of the processing units $S_{PU}$ 150 try to initiate the switch 281 more or less simultaneously. This potential problem then thus has to be handled.

Thus, since the drop mode/algorithm $A_{drop}$ processing is completely unsynchronized, at certain loads, there is a high likelihood that there are multiple interleaving attempts both to enter and exit drop mode/algorithm $A_{drop}$ processing at the same time. It is, according to an embodiment of the present invention, the responsibility of the exit code/method steps to make sure that one single (only one) processing unit PU will successfully end the drop mode/algorithm $A_{drop}$ processing, which also guarantees that all attempts to enter the drop mode/algorithm $A_{drop}$ processing again will be done/executed/performed after having exited the drop mode/algorithm. This may e.g. be accomplished by use of a multiple-compare-and-swap operation, wherein both a time-stamp and the mode/algorithm are atomically verified and updated. Hereby, it is ensured that exactly one processing unit is performing the switch. It is also ensured that, out of multiple possible interleaving attempts to enter and/or exist the drop mode, only the last attempt will succeed.

Other solutions exist to handle the above problems, e.g. by realizing that tokens in the bucket are accumulated with a certain rate. There is thus a certain time requirement in order for one single token to be accumulated. As most implementations of the token bucket algorithm will use integer calculus, selecting a time less than this will amount to zero tokens and multiple simultaneous updates will yield the same result. As an example, the drop mode/algorithm exit may be performed within a critical section, where the one or more PUs of the set $S_{PU}$ 150 are doing uninterrupted work (run-to-completion). The algorithm requires exact timing, wherefore the PUs should not be disturbed by interruptions, such as e.g. CPU migration, context switches or similar. There is a timestamp $T_d$ defined, which may be included in one or more of the herein described individual times $T1, T_2, \ldots, T_n$, or may be included in another time parameter, which indicates the time passed from when processing according to the drop mode $A_{drop}$ started, e.g. from when the packet processing is switched 271 from the serial mode/algorithm $A_{ser}$ to the drop mode/algorithm $A_{drop}$.

The PUs verify that the one or more timestamps $T_d$, the number of tokens in the bucket, the debts and/or the mode/algorithm have not been modified in the interim. It does so by comparing the original number of tokens and/or debts and associated one or more timestamps $T_d$ from the beginning, with the current values. Thus, for example, it may here be checked that the one or more timestamps $T_d$ have not been changed/altered. If at least one timestamp $T_d$ has been changed/altered, this is an indication of that the processing unit checking the time stamp $T_d$ is not the processing unit first having initialized the switch, and the run-to-completion work/processing is ended and processing according to the drop mode/algorithm $A_{drop}$ is continued for the processing unit. However, if the one or more timestamps $T_d$ are unchanged/unaltered, e.g. the number of tokens are relevant and should be checked, wherefore the run-to-completion work/processing continues with a compare and set (CAS) update of the mode/algorithm to the serial mode/algorithm $A_{ser}$. Since the CAS update is used for the mode/algorithm switch, only one processing unit will be successful with the update/switch. This successful processing unit will then also update the time stamp $T_d$. Thereafter, packet processing according to the synchronized serial mode/algorithm $A_{ser}$ is used. Hereafter, the run-to-completion work/processing is ended, regardless of if the CAS update is successful or not for the processing unit.

According to an embodiment of the present invention, the at least partly unsynchronized parallel packet processing algorithm $A_{par}$ further includes prioritized processing. The prioritized processing is then based on priority levels $P_{high}$; $P_{low}$ related to the at least one processing unit $PU_1$, $PU_2, \ldots, PU_n$ of the set $S_{PU}$; 150. The priority levels may e.g. be assigned to the packets to be processed. For example, one packet may have been assigned a higher priority level $P_{high}$. A processing unit $PU_{high}$ processing that higher priority packet is then therefore also assigned/related to that higher priority level $P_{high}$ when that higher priority packet is processed by the processing unit PU. Correspondingly, when the same processing unit PU at another point in time processes a packet assigned a lower priority level $P_{low}$, the processing unit $PU_{low}$ is then assigned/related to that lower priority level $P_{low}$ assigned to that packet.

When the prioritized processing is performed, a processing unit $PU_{high}$ assigned/related to a higher priority $P_{high}$ is allowed to process packets and to charge/debit a fractional debt $D_{1\_frac}, D_{2\_frac}, \ldots, D_{n\_frac}$ corresponding to the processing of those packets to one or more processing unit $PU_{low}$ of the set $S_{PU}$; 150 assigned/related to a lower priority $P_{low}$.

Thus, higher priority level packets are allowed to be processed by at least one processing unit $PU_{high}$ temporarily assigned a higher priority, and the fractional cost for that processing is debited one or more processing unit $PU_{low}$ assigned a lower priority level $P_{low}$.

When prioritized processing is used, the shares $C_1, C_2, \ldots, C_n$ of the total packet cost $C_{tot}$ for the at least one processing unit $PU_1, PU_2, \ldots, PU_n$; 151, 152, ..., 15n, respectively, include both fractional packet costs $C_{1\_frac}$, $C_{2\_frac}, \ldots, C_{n\_frac}$ for packets to be processed and also fractional debts $D_{1\_frac}, D_{2\_frac}, \ldots, D_{n\_frac}$ for processing of packets having a higher priority level $P_{high}$, wherein the debts are created by another higher priority processing unit $PU_{high}$; $C_1=C_{1\_frac}+D_{1\_frac}$, $C_2=C_{2\_frac}+D_{2\_frac}$, ..., $C_n=C_{n\_frac}+D_{n\_frac}$. It should be noted that packets are not, according to the embodiments of the present invention, divided when being processed, each packet is processed as a whole by one processing unit PU. This also means that the processing cost for each single packet is carried by one processing unit alone. However, the total number of packets to be processed are divided/spread over the set 150 of processing units $PU_1, PU_2, \ldots, PU_n$; 151, 152, ..., 15n, such that each processing unit $PU_1, PU_2, \ldots, PU_n$; 151, 152, ..., 15n processes one or more whole packets. Correspondingly, also the fractional debts $D_{1\_frac}$, $D_{2\_frac}, \ldots, D_{n\_frac}$ are related to processing of whole/entire packets.

The fractional debts $D_{1\_frac}, D_{2\_frac}, \ldots, D_{n\_frac}$ are decremented over time, e.g. to a minimum value of zero, when processing according to the parallel packet processing algorithm $A_{par}$ is used. Generally, fractional debts $D_{1\_frac}$, $D_{2\_frac}, \ldots, D_{n\_frac}$ are decremented over time with a rate corresponding to the quota with which the number of (fractional) tokens are incremented over time, even if there are no packets to process.

The above mentioned rules for when to switch between different processing modes/algorithms often compares the total costs $C_{tot}$ and/or the shares of the costs $C_1, C_2, \ldots, C_n$ with thresholds or other values in order to make a switch of mode/algorithm decision. For the prioritized processing, the shares $C_1, C_2, \ldots, C_n$ include both the fractional packet costs $C_{1\_frac}, C_{2\_frac}, \ldots, C_{n\_frac}$ for packets to be processed and also the possible fractional debts $D_{1\_frac}, D_{2\_frac}, \ldots, D_{n\_frac}$. Hereby, also the debts are considered, i.e. are taken into consideration, when the switching decisions are made. Correspondingly, the total cost $C_{tot}$ includes the total debt $D_{tot}$ for all the prioritized packets. Therefore, for example switching 260 from processing according to the serial packet processing algorithm $A_{ser}$ to the processing according to the parallel packet processing algorithm $A_{par}$ should be decided when the total number of tokens $N_{tot}$ is higher than a parallel processing threshold value $N_{tot\_par}$; $N_{tot}>N_{tot\_par}$; where the parallel processing threshold value $N_{tot\_par}$ is increased with a value $N_{debt\_sum}$ corresponding to a total debt $D_{tot}$. This may also be seen as the parallel processing threshold value $N_{tot\_par}$ is decreased with the value $N_{debt\_sum}$ corresponding to a total debt $D_{tot}$.

Figure 4:
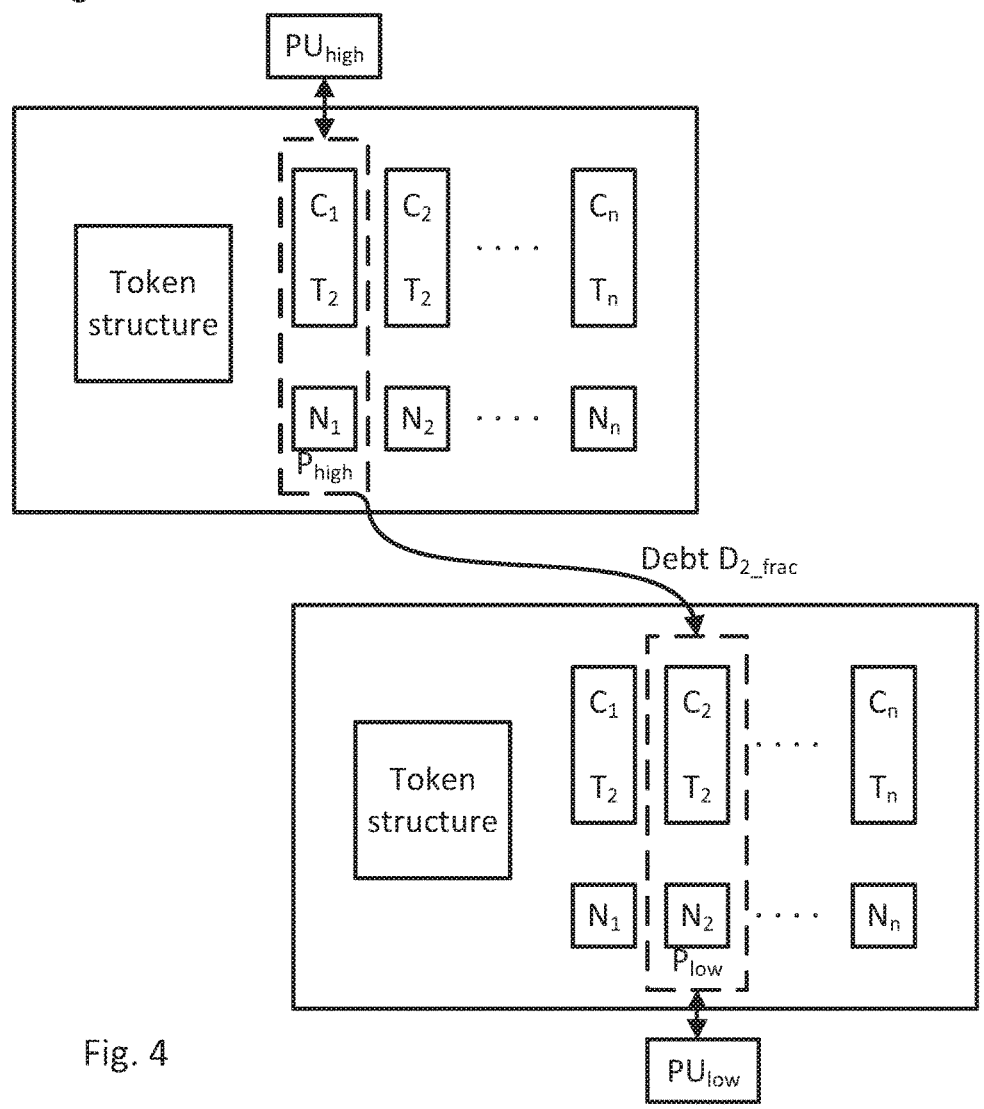
FIG. 4 schematically illustrates prioritized processing and debiting.

FIG. 4 schematically illustrates higher priority level $P_{high}$ packets being allowed to be processed by at least one processing unit $PU_{high}$ temporarily assigned a higher priority $P_{high}$, and the fractional packet cost $C_{2\_frac}$ for that processing being debited $D_{2\_frac}$ one or more cost shares $C_2$ related to a processing unit $PU_{low}$ assigned a lower priority level $P_{low}$.

Generally, as long as the network node 100 has enough resources to handle/process every single packet with the shortest possible latency, there is no point in traffic priority. To prioritize traffic is only advantageous when the traffic, i.e. the number of packets to process, exceeds the processing capacity of the network node 100. This corresponds to that a total processing cost $C_{tot}$ for processing the packets exceeds a total cost limit $C_{tot\_lim}$; $C_{tot} > C_{tot\_lim}$. In that situation, i.e. when the processing capacity is exceeded, it is essentially only possible to decrease traffic forwarding/processing. Prioritized processing according to the embodiment is therefore a method for decreasing, in a controlled manner, low-priority traffic just enough so that the network node 100 can handle the high-priority traffic/processing instead.

Conceptually we can define the total cost limit $C_{tot\_lim}$ for the traffic cost in general, and a priority cost limit $C_{prio\_high\_lim}$ for the high-priority traffic cost. Since the high-priority traffic cost $C_{prio\_high}$ is included in a priority cost $C_{prio}$, the higher priority packets/traffic will get the first share of the total cost $C_{tot}$ and the best-effort traffic, i.e. the lower priority packets, may be assigned any leftover costs. Neither the high-priority traffic/packets nor the best-effort traffic/packets may exceed the total cost limit $C_{tot\_lim}$. Therefore, setting the high priority cost limit $C_{prio\_high\_lim}$ higher than the total cost limit $C_{tot\_lim}$ is pointless. Setting high priority cost limit $C_{prio\_high\_lim}$ lower than the total cost limit $C_{tot\_lim}$ means that high-priority packets, whose cost would cause the high priority cost limit $C_{prio\_high\_lim}$ to be exceeded, will have to be handled/processed differently. Typically, this means that those high-priority packets are demoted/degraded, i.e. are reduced in status/priority, to the best-effort status/level $P_{low}$.

Keeping track of prioritized traffic to select whether to handle packets as high-priority $P_{high}$ or best-effort $P_{low}$, can be done with a limiting packet processing, which has been modified to not drop packets when the total cost limit $C_{tot\_lim}$ is exceeded. Instead, the packet processing only decides whether the packet should be forwarded/passed on or not. Packets that are forwarded/passed on are within the total cost limit $C_{tot\_lim}$, and packets that are not forwarded/passed on are demoted to best-effort level $P_{low}$. This is function may be denoted a tracking pipe, or a packet classifier, and in a signalling/security Gateway (SGW) code/algorithm it may be denoted a priority pipe, in contrast to a base pipe.

Generally, a pipe may be defined as a conceptual object including at least a token bucket processing structure for the processing mode/algorithm, at least one timestamp, at least one number of tokens in the bucket (which may be a fractional number of tokens) and/or at least one debt (which may be a fractional debt).

By processing according to the above described embodiments, introducing the concept of a token debt, and fractional debts, it is possible to turn the limiting packet processing into something that can decrease low-priority traffic/packet processing with just the amount required by the high-priority traffic/packet processing. The concept of debt means that a bucket, or a fractional bucket, may conceptually be seen as the bucket being allowed to have less than zero tokens. The more such conceptual negative tokens a bucket has, the longer the limiting processing will stay in the drop mode $A_{drop}$. Principally, when a high-priority packet is sent, it may also be pretended/assumed that a virtual copy of the high-priority packet was accounted related to the processing units PUs through which the low-priority packets are flowing, i.e. the fractional debt corresponding to the high priority packet is taken on by a lower priority traffic/packet processing unit. A virtual copy of the packet may be used, according to an embodiment, since the cost of the high-performance/priority packet is only actually charged/debited the low-priority processing unit, causing the high-priority packet to use up/eat bandwidth for the low-priority traffic/packet processing.

One possible problem with prioritized processing is that the high-priority traffic/packets should not have to wait for synchronization with the processing of the low-priority packets. Therefore, the debts are, according to an embodiment, represented as a per-PU variable, i.e. as the above described fractional debts $D_{1\_frac}, D_{2\_frac}, \ldots, D_{n\_frac}$. Technically, the fractional debts $D_{1\_frac}, D_{2\_frac}, \ldots, D_{n\_frac}$ could use the same per-CPU bucket, i.e. the same fractional bucket, as used by the parallel mode/algorithm $A_{par}$ packet processing, since the parallel mode/algorithm $A_{par}$ may be updated in parallel anyway. In a practical implementation, however, this has been found to introduce race-conditions and anomalies when the packet processing is rapidly switched between modes/algorithms. Therefore, a separate per-PU parameter is, according to embodiments of the present invention, used for controlling the debts, i.e. the fractional debts $D_{1\_frac}, D_{2\_frac}, \ldots, D_{n\_frac}$, which allows for completely unsynchronized addition of the fractional debts $D_{1\_frac}, D_{2\_frac}, \ldots, D_{n\_frac}$.

Additionally, the outstanding debt, i.e. the total debt $D_{tot}$ that the packet processing algorithm has not yet acknowledged, may be defined as the total sum of all per-PU debts, i.e. the sum of the fractional debts $D_{1\_frac}, D_{2\_frac}, \ldots, D_{n\_frac}$, minus the last known debt. This allows the packet processing algorithm to reset the outstanding total debt $D_{tot}$ after having handling it, even with ongoing simultaneous updates of the per-PU debt, i.e. of the fractional debts $D_{1\_frac}, D_{2\_frac}, \ldots, D_{n\_frac}$.

Thus, the summation of the total outstanding debt $D_{tot}$ is a relatively expensive operation, wherefore it is only done when necessary. If one such necessary event is missed, the total outstanding debt $D_{tot}$ remains as it is until later events happen. It appears that this allows the packet processing code/algorithm to be a bit flexible when it comes to decisions about when to sum up the outstanding debt, wherefore it may be advantageous to do this a little bit too seldom than too often. The end result is the same.

For example, in order to handle packet processing utilizing multiple priority levels $P_{high}, P_{low}$, the priority pipe may set up a sequence of multiple limiting/prioritizing pipes with support for utilization of the debt concept. These pipes may e.g. be denoted base pipes. All such base pipes may then be configured with the same quota and bucket depth, e.g. related to the total cost limit $C_{tot}$ of the whole prioritizing pipe. As a non-limiting example, traffic/packets classified as best-effort, i.e. as low priority $P_{low}$ packets, may e.g. be sent via a best effort base-pipe. Traffic/packets classified as highest priority may e.g. be sent via a highest priority base-pipe. If a packet is dropped, nothing more happens. However, assuming that highest priority base-pipe says/states/indicates that the packet is conformed to the pipe cost limit, the cost of the packet that already has been sent may also be applied to all base-pipes with a lower priority, down to the best-effort/low priority $P_{low}$ pipe. The effect is that higher priority level $P_{high}$ packets will eat/use up bandwidth for all lower priority levels $P_{low}$ packets. It should be noted that there may be two or more defined priority levels, i.e. there may be one or more defined priority levels between the best effort priority and the highest priority level.

Figure 2F:
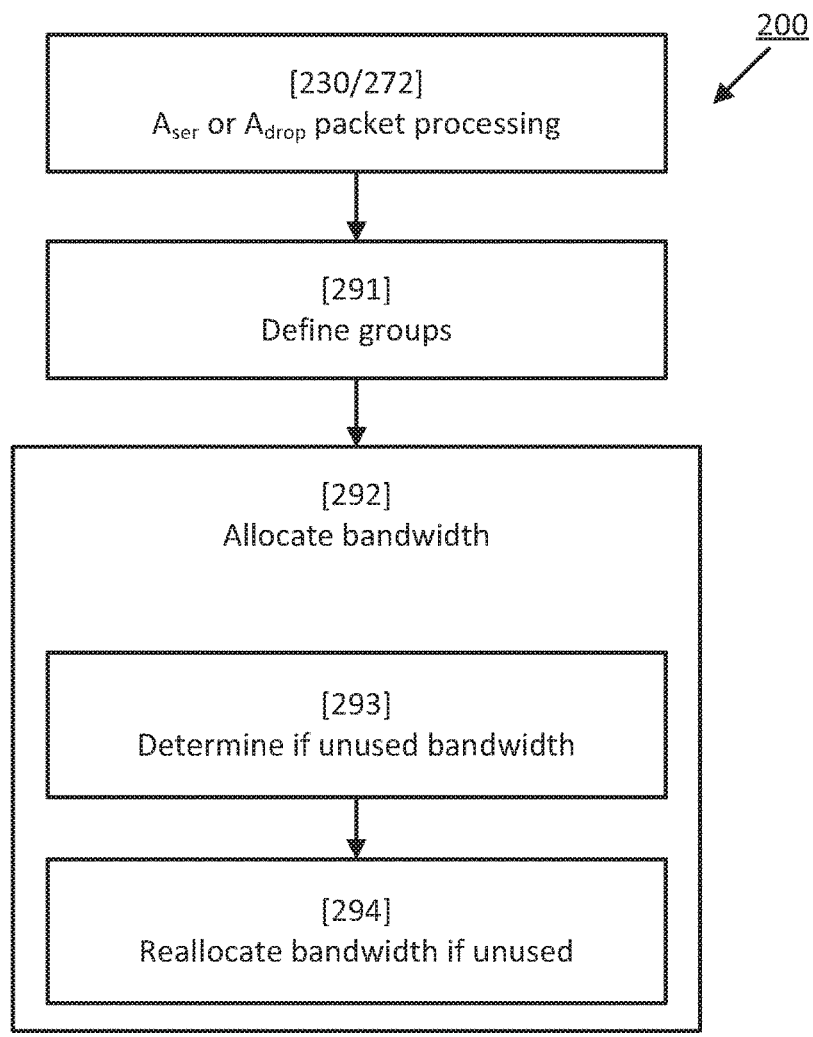

FIG. 2f illustrates a method 200 according to an embodiment of the present invention.

In a first step 230/272, packets are processed using the above described serial packet processing algorithm $A_{ser}$ and/or the above described drop mode algorithm $A_{drop}$.

In a second step 291, a set of at least one active group $G_1$, $G_2$, ... $G_K$ is defined, wherein each group is related to one or more devices receiving packets via the network node 100.

In a third step 292, at least one bandwidth portion of an available bandwidth, e.g. of the network 500 and/or of the network node 100, is allocated for the at least one active group $G_1$, $G_2$, ... $G_K$ of the set, respectively. This allocation 292 is performed in parallel and at least partly unsynchronized for the at least one active group $G_1$, $G_2$, ... $G_K$.

According to an embodiment, the at least one bandwidth portion is allocated 292 such that the available bandwidth is essentially equally divided between the at least one group $G_1$, $G_2$, ... $G_K$.

According to an embodiment of the present invention, the third step 292 of the method may include a fourth step 293, in which it is determined if one or more bandwidth portions of the at least one group $G_1$, $G_2$, ... $G_K$ are unused. The third step 292 may also include a fifth step 294, in which the one or more unused bandwidth portions are reallocated to one or more other of the at least one group $G_1$, $G_2$, ... $G_K$ being in need of more bandwidth. According to an embodiment, the one or more groups $G_1$, $G_2$, ... $G_K$ being in need of more bandwidth compete with each other for the one or more bandwidth portions being reallocated 294.

According to an embodiment of the present invention, the at least one client group $G_1$, $G_2$, ... $G_K$ is related to non-overlapping/separate one or more subsets $S_1$, $S_2$, ..., $S_k$ of the network traffic. The traffic may here be partitioned into the one or more subsets $S_1$, $S_2$, ..., $S_k$ by a suitable rule/definition decided e.g. by a network administrator. The one or more subsets $S_1$, $S_2$, ..., $S_k$ may e.g. be defined such that:
- each client group $G_1$, $G_2$, ... $G_K$ corresponds/includes the network traffic from a given IP address or network range;
- each client group $G_1$, $G_2$, ... $G_K$ corresponds/includes the network traffic to a given IP address or network range;
- each group $G_1$, $G_2$, ... $G_K$ corresponds/includes the network traffic related to higher layer data, such as a verified user and/or the type of data being transmitted.

This may also be described as the at least one client group $G_1$, $G_2$, ... $G_K$ being related to one or more in the group of:
- at least one source internet protocol (IP) address;
- at least one destination internet protocol (IP) address;
- at least one source network;
- at least one destination network;
- at least one source port;
- at least one destination port;
- at least one receiving interface;
- at least one forwarding interface;
- at least one parameter related to application layer data; and
- at least one partition of network traffic.

Grouping may be seen as essentially processing in form of a set of dynamic pipes/packet processing flows. Each group $G_1$, $G_2$, ... $G_K$ may allocate a set of group counters/parameters, that will keep track of the per-group limits and shares. The groups $G_1$, $G_2$, ... $G_K$ are allocated if they are needed, and are set free (not more allocated) when a time period $t_{inactive}$ of inactivity exceeds a threshold value $t_{inactive} > t_{inactive\_th}$. Fair sharing may be applied between the groups $G_1$, $G_2$, ... $G_K$, such that every active group $G_1$, $G_2$, ... $G_K$ is guaranteed an equal share of the limits/allocations. The groups $G_1$, $G_2$, ... $G_K$ are not restricted to this guarantee, however, if not all groups $G_1$, $G_2$, ... $G_K$ use their whole guaranteed share at the whole time, other groups can compete for the unused tokens/fractional tokens. Usually, there is no fair sharing of the unused tokens/fractional tokens, although it is possible to get a higher degree fair sharing if the groups are given a weighted share of the whole pipe/processing limit $C_{tot}$.

Thus, one basic principle of this embodiment of the present invention is to count the fair share of a given whole/total pipe/processing limit $C_{tot}$. This may be done per group $G_1$, $G_2$, ... $G_K$, and may then be regarded as a clearance over the corresponding whole/total pipe/processing limit $C_{tot}$. As long as there are enough tokens in the group share, the packet will pass and will be forwarded, and the fractional cost is debited to the whole pipe/processing limit $C_{tot}$. It should be noted that the sum of all group shares will never exceed the corresponding whole pipe/processing limit $C_{tot}$, wherefore this will never cause the whole pipe/processing counter to underflow. Unlike the whole pipe/processing counters, packets are not dropped or demoted when the group share counter has exceeded its per-group limit. Instead, the packet is passed through the whole pipe/processing counter, and any excess of the per group limit is then handled correspondingly as in the case that there is no grouping used.

According to a second aspect of the present invention, a network node 100 as illustrated in FIG. 1 is presented. The network node includes a processing device 120 arranged for performing the embodiments of the method of the invention.

According to an embodiment, the processing device 120 is arranged for processing packets to be transmitted in the network 500 according to at least:
- a serial packet processing algorithm $A_{ser}$ providing a synchronized utilization of a set $S_{PU}$; 150 of at least one processing unit $PU_1$, $PU_2$, ..., $PU_n$; 151, 152, ..., 15n; and
- a parallel packet processing algorithm $A_{par}$ providing an at least partly unsynchronized utilization of the set $S_{PU}$; 150 of at least one processing unit $PU_1$, $PU_2$, ..., $PU_n$; 151, 152, ..., 15n.

The processing device 120 is further arranged for sharing a total packet cost $C_{tot}$ corresponding to the processing of the packets such that it is cooperatively shared by the at least one processing unit $PU_1$, $PU_2$, ..., $PU_n$; 151, 152, ..., 15n of the set $S_{PU}$; 150.

Also, the processing device 120 is arranged for:
determining 210, when the processing according to the parallel packet processing algorithm $A_{par}$ is used for processing said packets, if shares $C_1$, $C_2$, ..., $C_n$ of the total packet cost $C_{tot}$ for one or more of the at least one processing units $PU_1$, $PU_2$, ..., $PU_n$; 151, 152, ..., 15n exceed a capacity to process packets for the at least one processing units $PU_1$, $PU_2$, ..., $PU_n$; 151, 152, ..., 15n, respectively, wherein each one of the shares $C_1$, $C_2$, ..., $C_n$ corresponds to one or more packet; and switching 220 from the processing according to the parallel packet processing algorithm $A_{par}$ to processing according to the serial packet processing algorithm $A_{ser}$ if said shares $C_1, C_2, \ldots, C_n$ of said total packet cost $C_{tot}$ for one or more of the at least one processing units $PU_1, PU_2, \ldots, PU_n$; 151, 152, ..., 15n, respectively, is determined 210 to exceed the capacity.

This may also be described as the network node 100 and/or the processing device 120 includes a determining unit 121 arranged for performing the above described determination 210, and a switching unit 122 arranged for performing the above described switching 122.

The network node 100, and the processing device 120, may be arranged for implementing any of the herein described embodiments of present invention, and may therefore be provided with corresponding units implementing those embodiments.

Furthermore, any methods according to embodiments of the invention may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

The processing device 120 described herein may in an embodiment comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

The invention claimed is:

1. A method for traffic shaping of a packet switched network, including processing of packets to be transmitted in said packet switched network according to at least:
   a serial packet processing algorithm providing a synchronized utilization of a set of at least one processing unit; and
   a parallel packet processing algorithm providing an at least partly unsynchronized utilization of said set of at least one processing unit; wherein
   said processing of said packets corresponds to a total packet cost, which is cooperatively shared by said at least one processing unit of said set;
   said method comprising the steps of:
   determining when said processing according to said parallel packet processing algorithm is used for processing said packets, if shares of said total packet cost for one or more of said at least one processing units; exceed a capacity to process packets for said at least one processing units, respectively, wherein each one of the shares corresponds to one or more packet; and
   switching from said processing according to said parallel packet processing algorithm to processing according to said serial packet processing algorithm if said shares of said total packet cost for one or more of said at least one processing units, respectively, is determined to exceed said capacity.

2. The method as claimed in claim 1, wherein said at least partly unsynchronized parallel packet processing algorithm $A_{par}$ further includes:
   prioritizing processing based on priority levels related to said at least one processing unit of said set, whereby:
   a processing unit related to a higher priority is allowed to process packets and to charge a fractional debt corresponding to the processing of said packets to one or more processing unit of said set related to a lower priority; and
   said shares of said total packet cost for said at least one processing unit, respectively, include both fractional packet costs and fractional debts.

3. The method as claimed in claim 2, wherein said fractional debts are decremented over time when processing according to said parallel packet processing algorithm is used.

4. The method as claimed in claim 1, wherein
   an at least partly unsynchronized processing unit, which processes packets according to said parallel packet processing algorithm and for which said share of said total packet cost exceeds its capacity to process packets, is incapable to determine if said set of at least one processing unit as a whole is able to process said packets; and
   said at least partly unsynchronized processing unit requests for said switch to said processing according to said serial packet processing algorithm $A_{ser}$ as a result of its incapability to determine if said set of at least one processing unit as a whole is able to process said packets.

5. The method as claimed in claim 1, wherein one or more of said at least one processing unit are one in the group of:
   a central processing unit (CPU); and
   a central processing unit core.

6. The method as claimed in claim 1, wherein:
   said parallel packet processing algorithm is an at least partly unsynchronized token bucket algorithm;
   said total packet cost is related to a total number of tokens;
   said total number of tokens is portioned over said set as fractional numbers of tokens for said at least partly unsynchronized at least one processing unit, respectively
   said shares of said total packet cost are related to said fractional numbers of tokens, respectively.

7. The method as claimed in claim 6, wherein said share of said total packet cost for a processing unit is determined to exceed its capacity to process packets if one or more is true in the group of:
   the share of said processing unit exceeds its fractional number of tokens; and
   said processing unit has zero fractional number of tokens left.

8. The method as claimed in claim 6, wherein said fractional numbers of tokens are incremented over time when processing according to said parallel packet processing algorithm is used.

9. The method as claimed in claim 6, further including:
   summing up all of said fractional numbers of tokens to an accumulated total number of tokens;
   summing up all shares to an accumulated total cost; and utilizing at least one of: (i) said total number of tokens and (ii) said total cost when switching to processing according to said serial packet processing algorithm or when switching to processing according to a drop mode algorithm.

10. The method as claimed in claim 9, wherein said serial packet processing algorithm includes:
incrementing a total number of tokens over time faster than tokens are spent by said serial packet processing algorithm; and
switching from processing according to said serial packet processing algorithm to said processing according to said parallel packet processing algorithm when said total number of tokens is higher than a parallel processing threshold value.

11. The method as claimed in claim 10, wherein said parallel processing threshold value is increased with a value corresponding to a total debt when said total cost includes said total debt.

12. The method as claimed in claim 6, further including:
switching from processing according to said serial packet processing algorithm to processing according to a drop mode algorithm; and
processing said packets according to said drop mode algorithm using said set of said at least partly unsynchronized at least one processing unit if at least one is true in the group of:
said total number of tokens has a value of zero; and
said total cost exceeds a total number of tokens.

13. The method as claimed in claim 12, wherein processing according to said drop mode algorithm includes one or more actions in the group of:
dropping at least one packet;
queueing at least one packet; and
transmitting at least one packet labelled as non-conformant.

14. The method as claimed in claim 6, further including, if a total number of tokens exceeds said total cost:
switching from processing according to said drop mode algorithm to processing according to said serial packet processing algorithm; and
processing said packets according to said serial mode algorithm.

15. The method as claimed in claim 1, further including:
defining a set of at least one active group, each group being related to one or more devices receiving packets via a network node; and
allocating at least one bandwidth portion of an available bandwidth in said network for said at least one active group of said set, respectively, wherein said allocating is performed in parallel and at least partly unsynchronized for said at least one active group.

16. The method as claimed in claim 15, wherein said at least one client group is related to one or more in the group of:
at least one source internet protocol address;
at least one destination internet protocol address;
at least one source network;
at least one destination network;
at least one source port;
at least one destination port;
at least one receiving interface;
at least one forwarding interface;
at least one parameter related to application layer data; and
at least one partition of network traffic.

17. The method as claimed in claim 15, wherein said allocating of said at least one bandwidth portion is performed such that the available bandwidth is essentially equally divided between the at least one group.

18. The method as claimed in claim 15, wherein said allocating of said at least one bandwidth portion further includes:
determining if one or more bandwidth portions of the at least one group is unused; and
reallocating said one or more unused bandwidth portions to one or more other of said at least one group being in need of more bandwidth.

19. The method as claimed in claim 18, wherein said one or more groups being in need of more bandwidth compete with each other for the one or more bandwidth portions being reallocated.

20. A non-transitory computer readable storage medium comprising a computer program with a program code for performing a method according to claim 1, when the computer program runs on a computer.

21. A network node of a packet switched network, comprising:
a processing device arranged for processing packets to be transmitted in said packet switched network according to at least:
a serial packet processing algorithm providing a synchronized utilization of a set of at least one processing unit; and
a parallel packet processing algorithm providing an at least partly unsynchronized utilization of said set of at least one processing unit; wherein
said processing of said packets corresponds to a total packet cost, which is cooperatively shared by said at least one processing unit of said set;
wherein said processing device is arranged to:
determine, when said processing according to said parallel packet processing algorithm is used for processing said packets, if shares of said total packet cost for one or more of said at least one processing units exceed a capacity to process packets for said at least one processing units, respectively, wherein each one of the shares corresponds to one or more packet; and
switch from said processing according to said parallel packet processing algorithm to processing according to said serial packet processing algorithm $A_{ser}$ if said shares of said total packet cost for one or more of said at least one processing units, respectively, is determined to exceed said capacity.

22. The network node as claimed in claim 21, wherein one or more of said at least one processing unit are one in the group of:
a central processing unit; and
a central processing unit core.

* * * * *